US007668305B2

(12) United States Patent
Akizuki et al.

(10) Patent No.: US 7,668,305 B2
(45) Date of Patent: Feb. 23, 2010

(54) COMMUNICATION SYSTEM BASED ON SIP, AND COMMUNICATION TERMINAL

(75) Inventors: Takeo Akizuki, Osaka (JP); Junichi Morimoto, Osaka (JP); Osamu Shimada, Osaka (JP); Kiyoko Yamamoto, Osaka (JP)

(73) Assignee: Fujitsu Limited, Kawasaki (JP)

( * ) Notice: Subject to any disclaimer, the term of this patent is extended or adjusted under 35 U.S.C. 154(b) by 1172 days.

(21) Appl. No.: 11/044,469

(22) Filed: Jan. 27, 2005

(65) Prior Publication Data

US 2006/0013371 A1 Jan. 19, 2006

(30) Foreign Application Priority Data

Jul. 14, 2004 (JP) .............................. 2004-207690

(51) Int. Cl.
*H04M 3/42* (2006.01)
(52) U.S. Cl. .................. 379/211.01; 370/352; 370/353; 370/354; 370/355; 370/356; 379/207.12; 379/212.01; 379/213.01; 379/214.01; 455/417; 709/224
(58) Field of Classification Search ......... 370/351–356; 379/207.12, 211.01, 212.01, 213.01, 214.01; 455/417; 709/224
See application file for complete search history.

(56) References Cited

U.S. PATENT DOCUMENTS

| | | | | | |
|---|---|---|---|---|---|
| 3,725,599 | A | * | 4/1973 | Krock et al. | 379/213.01 |
| 3,737,587 | A | * | 6/1973 | Romero | 379/214.01 |
| 6,798,755 | B2 | * | 9/2004 | Lillie et al. | 370/312 |
| 7,088,807 | B2 | * | 8/2006 | Kim | 379/142.04 |
| 7,139,378 | B2 | * | 11/2006 | Kreten et al. | 379/201.02 |
| 7,283,516 | B1 | * | 10/2007 | Ganesan et al. | 370/352 |
| 7,417,988 | B1 | * | 8/2008 | Tripathi et al. | 370/389 |
| 7,440,440 | B1 | * | 10/2008 | Abichandani et al. | 370/351 |
| 7,480,260 | B1 | * | 1/2009 | Vashisht et al. | 370/260 |

(Continued)

FOREIGN PATENT DOCUMENTS

| | | |
|---|---|---|
| JP | 10-173813 | 6/1998 |
| JP | 2002-118655 | 4/2002 |
| JP | 2002-152224 | 5/2002 |
| JP | 2003-283653 | 10/2003 |

OTHER PUBLICATIONS

A. Johnston et al. Session Initiation Protocol Service Examples, draft-ietf-sipping-service-examples-05. Sipping Working group Aug. 29, 2003.

(Continued)

*Primary Examiner*—Hemant Patel
(74) *Attorney, Agent, or Firm*—Katten Muchin Rosenman LLP

(57) ABSTRACT

A communication system based on a communication protocol such SIP includes a first communication terminal Bob and a second communication terminal Bill, wherein the second communication terminal Bill has a unit, when the first communication terminal Bob receives an incoming message from a source communication terminal Alice, transmitting a substitute response control message to the first communication terminal Bob, the first communication terminal Bob has an incoming message transferring unit, when receiving the substitute response control message, transferring the incoming message given from the source terminal Alice to the second communication terminal Bill and has a response message transmitting unit transmitting to the source communication terminal Alice a response message containing contact information for specifying the second communication terminal Bill, and a call is established between the source communication terminal Alice and the second communication terminal Bill.

10 Claims, 25 Drawing Sheets

U.S. PATENT DOCUMENTS

| | | | |
|---|---|---|---|
| 7,492,887 B1 * | 2/2009 | Stumer et al. | 379/265.01 |
| 2004/0086102 A1 * | 5/2004 | McMurry et al. | 379/219 |
| 2004/0131042 A1 * | 7/2004 | Lillie et al. | 370/351 |
| 2004/0170267 A1 * | 9/2004 | Seligmann | 379/211.01 |
| 2005/0138128 A1 * | 6/2005 | Baniel et al. | 709/206 |
| 2005/0226230 A1 * | 10/2005 | Dorenbosch | 370/352 |
| 2005/0238157 A1 * | 10/2005 | Shaffer et al. | 379/211.01 |

OTHER PUBLICATIONS

Notice of Reason for Rejection dated Feb. 24, 2009, from the corresponding Japanese Application.

* cited by examiner

FIG. 6

<< INVITE FROM ALICE TO BOB >>

INVITE sips:bob@biloxi.example.com SIP/2.0
Via: SIP/2.0/TLS client.atlanta.example.com:5061;branch=z9hG4bK74bf9
Max-Forwards: 70
From: Alice <sips:alice@atlanta.example.com>;tag=1234567
To: Bob <sips:bob@biloxi.example.com>
Call-ID: 12345601@atlanta.example.com
CSeq: 1 INVITE
Contact: <sips:alice@client.atlanta.example.com>
Content-Type: application/sdp
Content-Length: ...

SDP INFORMATION {
v=0
o=alice 2890844526 2890844526 IN IP4 client.atlanta.example.com
s=Session SDP
c=IN IP4 client.atlanta.example.com
t=3034423619 0
m=audio 49170 RTP/AVP 0
a=rtpmap:0 PCMU/8000
}

FIG. 7

```
F3 PICKUP Bill -> Bob

PICKUP sips:bob@biloxi.example.com SIP/2.0
Via: SIP/2.0/TLS pc.biloxi.example.com:5061;branch=z9hG4bK74bf
Max-Forwards:70
From: Bill <sips:bill@biloxi.example.com>;tag=8675309
To: Bob <sips:bob@biloxi.example.com>
Call-ID: rt4353gs2egg@pc.biloxi.example.com
CSeq: 1 PICKUP
Contact: <sips:bill@pc.biloxi.example.com>
Event: dialog
Pickup-Group: Group-A
User-Priority: General
Pickup-Authorization: user01
Source-User-Agent: alice@atlanta.example.com
Content-Length: 0
```

FIG. 8

<< 200 OK FROM BOB TO ALICE >>
SIP/2.0 200 OK
Via: SIP/2.0/TLS client.atlanta.example.com:5061;branch
=z9hG4bK74bf9;received=192.0.2.103
From:Bob <sips:bob@biloxi.example.com>;tag=314159
To:Alice <sips:alice@atlanta.example.com>;tag=1234567
Call-ID: 12345601@atlanta.example.com
CSeq: 1 INVITE
Contact: <sips:bill@client.biloxi.example.com>
Content-Type: application/sdp
Content-Length: ...

SDP INFORMATION {
v=0
o=bob 2890844527 2890844527 IN IP4 client.biloxi.example.com
s=Session SDP
c=IN IP4 client.biloxi.example.com
t=3034423619 0
m=audio 3456 RTP/AVP 0
a=rtpmap:0 PCMU/8000
}

FIG. 9

<< ACK FROM ALICE TO BILL >>

ACK sips:bob@client.biloxi.example.com SIP/2.0
Via: SIP/2.0/TLS client.atlanta.example.com:5061;branch=z9hG4bK74bf92
Max-Forwards: 70
From: Alice <sips:alice@atlanta.example.com>;tag=1234567
To: Bill <sips:bill@biloxi.example.com>;tag=314159
Call-ID: 12345601@atlanta.example.com
CSeq: 1 ACK
Content-Length: 0

COMMUNICATION SYSTEM BASED ON SIP, AND COMMUNICATION TERMINAL

BACKGROUND OF THE INVENTION

The invention relates generally to a communication system for performing communications between communication terminals on the basis of a communication protocol such as SIP (Session Initiation Protocol), and more particularly to a communication system and a communication terminal each enabling other communication terminal to make a response to an incoming call as a substitute for a communication terminal receiving the incoming call according to SIP.

There has hitherto been proposed a communication system (refer to, e.g., Non-Patent document 1) enabling other communication terminal to make a response to an incoming call as a substitute for a communication terminal receiving the incoming call according to the communication protocol such as SIP (Session Initiation Protocol). This communication system is configured as, for example, as shown in FIG. 1, a communication system utilizing so-called IP telephones. To be specific, IP telephones (which will hereinafter be called communication terminals) 11, 12 are connected to a LAN 15 (an IP network), and the LAN 15 is connected to an IP network 30 (e.g., the Internet) extending in a wide area via a communication control device 14 (e.g., a router, etc.). Then, other communication terminal 20 connected to the IP network 30 can perform voice communications (RTP: Real-Time Transport Protocol) with any one of the communication terminals 11, 12 connected to the LAN 15 via the IP network 30, the communication control device 14 and the LAN 15.

Each terminal has a functional configuration as shown in, for example, FIG. 2.

In FIG. 2, each of the communication terminals 11, 12 has a layered configuration built up by a user interface unit 101, a line control unit 102, a transaction unit 103 and a transport unit 104. The transport unit 104 has a function of sending a message via the LAN 30, and the transaction unit 103 has a function of accepting further via the transport unit 104 the message sent through the LAN 30, a function of retransmitting the message, etc. The line control unit 102 has a function of executing call control, and the user interface unit 101 has functions of generating a control message based on a user's operation, effecting output control for the user on the basis of the received message, and so on.

In this type of communication system, in a case (a case of substitute response) where the communication terminal 12 makes a response to an incoming call given from the communication terminal 20 to the communication terminal 11, for instance, the processing is executed based on a procedure shown in FIG. 3. Note that the communication terminal 20 is named [Alice], the communication terminal 11 is named [Bob], and the communication terminal 12 is named [Bill] in FIG. 3 pursuant to the description of Non-Patent document 1.

In FIG. 3, when Bob receives an incoming message INVITE F1 from Alice, Bob sends a ringing message 180 Ringing F2 back to Alice. A ringing tone is thereby outputted at Alice, and simultaneously an incoming tone is outputted at Bob. In this status, when Bill performs off-hook together with a predetermined operation (an operation for making a substitute response) in order for Bill to make a response (PICKUP) to the incoming call to Bob, a status acquisition request message SUBSCRIBER F3 is sent to Bob from Bill. Bob sends a receipt response 200 OK F4 to this status acquisition request message SUBSCRIBER F3 to Bill, and simultaneously transmits a consent message NOTIFY F5 representing consent to the status acquisition request message SUBSCRIBER F3.

Bill, when receiving the consent message NOTIFY F5, sends a receipt response 200 OK F6 to Bob and thereafter transmits a substitute incoming message INVITE Replace: Bob F7 to Alice in order to notify Alice of a purport of making a substitute response to the incoming call to Bob. Alice, when receiving the substitute incoming message INVITE Replace: Bob F7, sends a receipt response 200 OK F8 to Bill. Thereafter, Alice sends to Bob a cancel message CANCEL F9 for canceling the ringing given to Bob. Then, Bob, after transmitting a receipt response 200 OK F10 to the cancel message CANCEL to Alice, sends a message 487 F11 indicating confirmation that the incoming message INVITE F1 has been canceled. Alice transmits to Bob an acknowledgment notifying message ACK F12 with respect to the message 487 F11 sent from Bob.

Bill, when receiving from Alice the receipt response 200 OK F8 about the substitute incoming message INVITE Replace: Bob F7, sends an acknowledgment notifying message ACK F13 to Alice. Then, as described above, Bob, who has confirmed that the ringing from Alice has been canceled, sends to Bill a consent message NOTIFY F14 representing consent to Bill's making the response to the ringing from Alice, and Bill receiving this consent message NOTIFY F14 transmits to Bob a message 481 F15 indicating the confirmation thereof.

Through the procedures described above, Bob recognizes that Bill responds to the ringing from Alice, Alice recognizes that a communication with Bill is conducted by canceling the ringing to Bob, and Bill recognizes that the communication with Alice becomes possible. In this state, a call based on RTP (Real-Time Transport Protocol) is established between Alice and Bill, and voice communications can be performed between Alice and Bill. Then, when Alice sends a call disconnection message BYE F16 to Bill with an end of speech, Bill sends a receipt response 200 OK F17 back thereto, thereby terminating the communications between Alice and Bill.

According to this type of communication system, when Alice rings up Bob, Bill becomes capable of making a response to this ringing. Therefore, even if Bob (an operator of the communication terminal 11) is absent, Alice can talk with Bill (an operator of the communication terminal 12) who replaces Bob.

[Non-Patent document 1] SIPPING Working Group Internet-Draft [draft-ietf-sipping-service examples-05]

SUMMARY OF THE INVENTION

In the conventional communication system described above, however, when the other communication terminal 12 (Bill) makes the response (the substitute response) to the ringing given from the source communication terminal 20 (Alice) to the communication terminal 11 (Bob), the procedures (SUBSCRIBER F3, NOTIFY 14, 481 F15, etc.) for confirming and consenting to the substitute response are required between the communication terminal 12 making the substitute response and the communication terminal 11, and there are also needed the procedures (CANCEL F9, 200 OK F10, 487 F11, ACK F12) for canceling the ringing from the source communication terminal 20 to the terminal 11. Thus, those procedures for switching over the call are comparatively complicated.

Further, the source communication terminal 20 (Alice), in a status of receiving the ringing message 180 Ringing F2 to the incoming message INVITE F1, receives the substitute incoming message INVITE Replace: Bob F7 from the communication terminal 12 for the substitute response and must execute a special process for this message, and implementation of such a function is comparatively difficult.

The invention, which was devised to obviate the defects in the conventional communication system explained above, aims at providing a communication system enabling other communication terminal to make a response in a comparatively simple procedure to ringing from a source communication terminal to a certain communication terminal.

A communication system according to the invention is configured so that a source communication terminal and a plurality of communication terminals, which are connected to an IP network, perform communications based on a communication protocol such as SIP, the plurality of communication terminals include a first communication terminal and a second communication terminal, the second communication terminal comprises a unit transmitting a substitute response control message to the first communication terminal on the basis of a predetermined trigger when the first communication terminal receives an incoming message from the source communication terminal, the first communication terminal comprises an incoming message transfer unit transferring to the second communication terminal the incoming message given from the source terminal when receiving the substitute response control message from the second communication terminal, and a response message transmitting unit transmitting to the source communication terminal a response message containing contact information for specifying the second communication terminal, wherein a call is established between the source communication terminal receiving the response message and the second communication terminal to which the incoming message has been transferred.

With this configuration, when the second communication terminal sends the substitute response control message to the first communication terminal receiving the incoming message from the source communication terminal, the first communication terminal receiving the substitute response control message sends the incoming message to the second communication terminal, and simultaneously transmits to the source communication terminal the response message containing the contact information for specifying the second communication terminal. The second communication terminal is thereby capable of identifying the source communication terminal from the incoming message, and the source communication terminal can identify the second communication terminal from the contact information contained in the response message. As a result, the call is established between the source communication terminal and the second communication terminal, which can identify each other, and the communications (e.g., voice communications) become executable between the source communication terminal and the second communication terminal. Namely, the second communication terminal can make the response to the ringing from the source communication terminal to the first communication terminal.

The predetermined trigger for determining transmission timing of the substitute response control message on the second communication terminal, may be determined by a predetermined operation of an operator of the second communication terminal or may be automatically determined within the communication system.

Further, a communication system according to the invention can be configured so that the first communication terminal comprises a judging unit judging based on the substitute response control message whether a substitute response by the second communication terminal is permitted or not, and the incoming message transfer unit, when judging that the substitute response by the second communication terminal is permitted, transfers the incoming message given from the source communication terminal to the second communication terminal.

Owing to this configuration, on the first communication terminal receiving the incoming message from the source communication terminal, it is possible to determine whether or not the other communication terminal (the second communication terminal) is made to do the substitute response to the incoming message.

Moreover, a communication system according to the invention can be configured so that the substitute response control message contains group information representing a group to which the second communication terminal belongs, and the judging unit includes a unit judging whether the substitute response is permitted or not on the basis of whether or not the group represented by the group information contained in the substitute response control message is the same as a group to which the first communication terminal belongs.

With this configuration, only the other communication terminal (the second communication terminal) belonging to the same group as the self-communication-terminal (the first communication terminal) belongs to, can be made to do the substitute response to the incoming message from the source communication terminal.

A communication system according to the invention is configured so that a source communication terminal and a plurality of communication terminals, which are connected to an IP network, perform communications based on a communication protocol such as SIP, the plurality of communication terminals each comprise a unit transmitting a substitute response control message to the first communication terminal on the basis of a predetermined trigger when the first communication terminal included in the plurality of communication terminals receives an incoming message from the source communication terminal, the first communication terminal comprises a terminal selection unit selecting, when receiving the substitute response control message from each of the plurality of communication terminals as candidate communication terminals other than the first communication terminal, a second communication terminal that should make a substitute response from within the plurality of candidate communication terminals on the basis of the substitute response message, an incoming message control unit making the selected second communication terminal effectively obtain the incoming message given from the source communication terminal, and a unit transmitting to the source communication terminal a response message containing contact information for specifying the selected second communication terminal, wherein a call is established between the source communication terminal receiving the response message containing the contact information and the second communication terminal that has effectively obtained the incoming message.

With this configuration, when each of the plurality of candidate communication terminals sends the substitute response control message to the first communication terminal receiving the incoming message from the source communication terminal, the second communication terminal that should make the substitute response is selected from within the plurality of candidate communication terminals on the basis of the substitute response control message in the first communication terminal. Then, the first communication terminal makes the selected second communication terminal obtain the incoming message given from the source communication terminal, and simultaneously sends to the source communication terminal the response message containing the contact information for specifying the selected second communication terminal. The selected second communication terminal is thereby capable of identifying the source communication terminal from the incoming message, and the source communication terminal can identify the second communication terminal from the contact information contained in the response message. As a result, the call is established between the source communication terminal and the second communication terminal, which can recognize each other, and the communications (e.g., voice communications) become executable between the source communication terminal and the second communication terminal. Namely, the second communication terminal selected by the first communication terminal can make the response to the ringing from the source communication terminal to the first communication terminal.

A method by which the first communication terminal makes the second communication terminal effectively obtain the incoming message may be such that the incoming message is transmitted to only the selected second communication terminal, and may also be such that the incoming message is sent to all the candidate communication terminals each serving as the source of the substitute response control message, and thereafter the incoming message to the candidate communication terminals excluding the selected second communication terminal is invalidated. In the latter case, a communication system according to the invention can be configured so that the incoming message control unit includes: a unit transferring the incoming message given from the source communication terminal to each of the plurality of candidate communication terminals each serving as a source of the substitute response control message, and a unit transmitting a response release message to the candidate terminals excluding the selected second communication terminal, and the incoming message to the candidate communication terminals excluding the second communication terminal, is invalidated.

Further, a communication system according to the invention can be configured so that the terminal selection unit selects, as the second communication terminal, the candidate communication terminal serving as a source of the substitute response control message received for the first time by the first communication terminal.

Owing to this configuration, the candidate communication terminal serving as the source of the substitute response control message received earliest by the first communication terminal, is selected as the second communication terminal, and hence the response to the incoming message is made by the candidate communication terminal serving as the source of the substitute response control message received earliest by the first communication terminal.

Moreover, a communication system according to the invention can be configured so that the substitute response control message contains priority level information representing a priority level, and the terminal selection unit selects the second communication terminal from within the plurality of candidate terminals on the basis of the priority level information.

With this configuration, the candidate communication terminal serving as the source of the substitute response control message containing the priority level information representing the highest priority level, is selected as the second communication terminal, and therefore the response to the incoming message to the first communication terminal is made by the candidate communication terminal serving as the source of the substitute response control message containing the priority level information representing the highest priority level.

A communication terminal used in a communication system according to the invention is constructed so that a source communication terminal and a plurality of communication terminals, which are connected to an IP network, perform communications based on a communication protocol such as SIP, any one communication terminal included in the plurality of communication terminals, comprises a unit transmitting a substitute response control message to the communication terminal receiving an incoming message on the basis of a predetermined trigger when receiving the incoming message from the source communication terminal, an incoming message obtaining unit obtaining the incoming message from the communication terminal receiving the incoming message after transmitting the substitute response control message, and a call connection control unit establishing a call with the source communication terminal on the basis of the incoming message after obtaining the incoming message.

A communication terminal used in a communication system according to the invention in which a source communication terminal and a plurality of communication terminals, which are connected to an IP network, perform communications based on a communication protocol such as SIP, is constructed by comprising an incoming message transfer unit transferring the incoming message to a substitute response request communication terminal when receiving a substitute response control message from the substitute response request communication terminal included in the plurality of communication terminals after receiving the incoming message from the source communication terminal, and a unit transmitting to the source communication terminal a response message containing contact information for specifying the substitute response request communication terminal.

Further, a communication terminal used in a communication system in which a source communication terminal and a plurality of communication terminals, which are connected to an IP network, perform communications based on a communication protocol such as SIP, is constructed by comprising a terminal selection unit selecting a substitute response communication terminal that should make a substitute response from within the plurality of communication terminals as candidate communication terminals on the basis of a substitute response control message when receiving the substitute response control message from each of the plurality of candidate communication terminals included in the plurality of communication terminals after receiving an incoming message from the source communication terminal, an incoming message control unit making the selected substitute response communication terminal effectively obtain the incoming message given from the source communication terminal, and a unit transmitting to the source communication terminal a response message containing contact information for specifying the selected substitute response communication terminal.

Further, the invention may be a method by which a computer or other device, machine, etc. executes any one of the processes. Still further, the invention may be a program for making the computer or other device, machine, etc. actualize any one of the functions. Yet further, the invention may be a storage medium readable by the computer, etc., which is stored with this type of program.

According to the communication system of the invention, the first communication terminal receiving the incoming message from the source communication terminal transfers the incoming message to the second communication terminal, and simultaneously sends to the source communication terminal the response message containing the contact information for specifying the second communication terminal, whereby the second communication terminal replacing the first communication terminal can perform the communication with the source communication terminal. Hence, there is neither the necessity for the procedure, etc. in which the source terminal cancels the incoming message with respect to the first communication terminal, nor the necessity of having a function of receiving the substitute incoming message from the other communication terminal in a state where the source terminal has sent the incoming message and receives the ringing message from the first communication terminal, thereby enabling the other communication terminal (the second communication terminal) to make the response in a much simpler procedure to the ringing from the source communication terminal to a certain communication terminal (the first communication terminal).

DESCRIPTION OF THE DRAWINGS

FIG. 6 is A diagram showing an example of a structure of an incoming message INVITE, FIG. 7 is A diagram showing an example of a structure of a PICKUP message, FIG. 8 is A diagram showing an example of a structure of a receipt response 200 OK, FIG. 9 is A diagram showing an example of a structure of an acknowledgment response message ACK.

DETAILED DESCRIPTION OF THE INVENTION

An embodiment of the invention will hereinafter be described with reference to the drawings.

Figure 1:
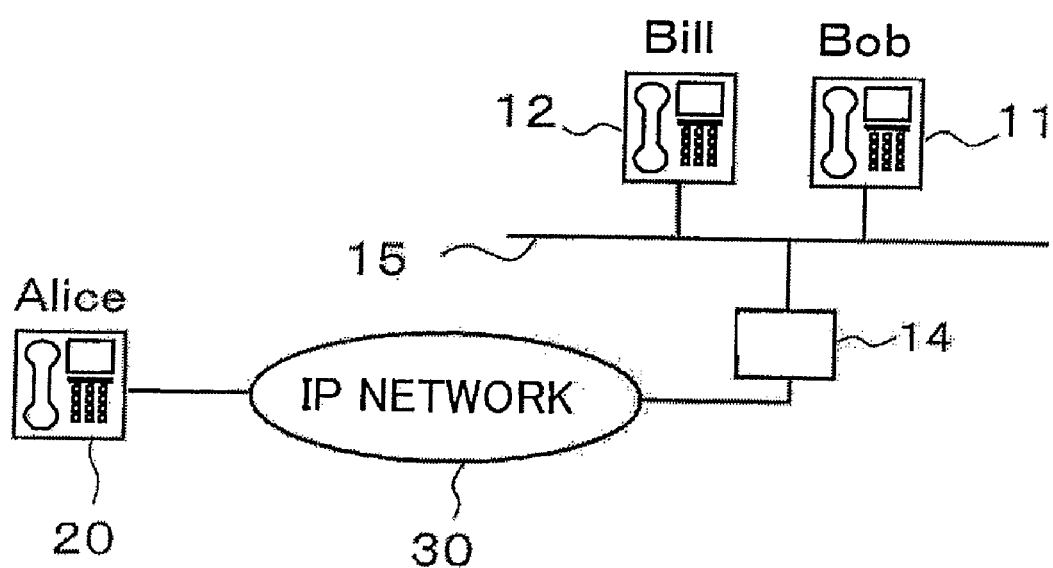
FIG. 1 is A view showing a hardware architecture of a communication system.
Figure 2:
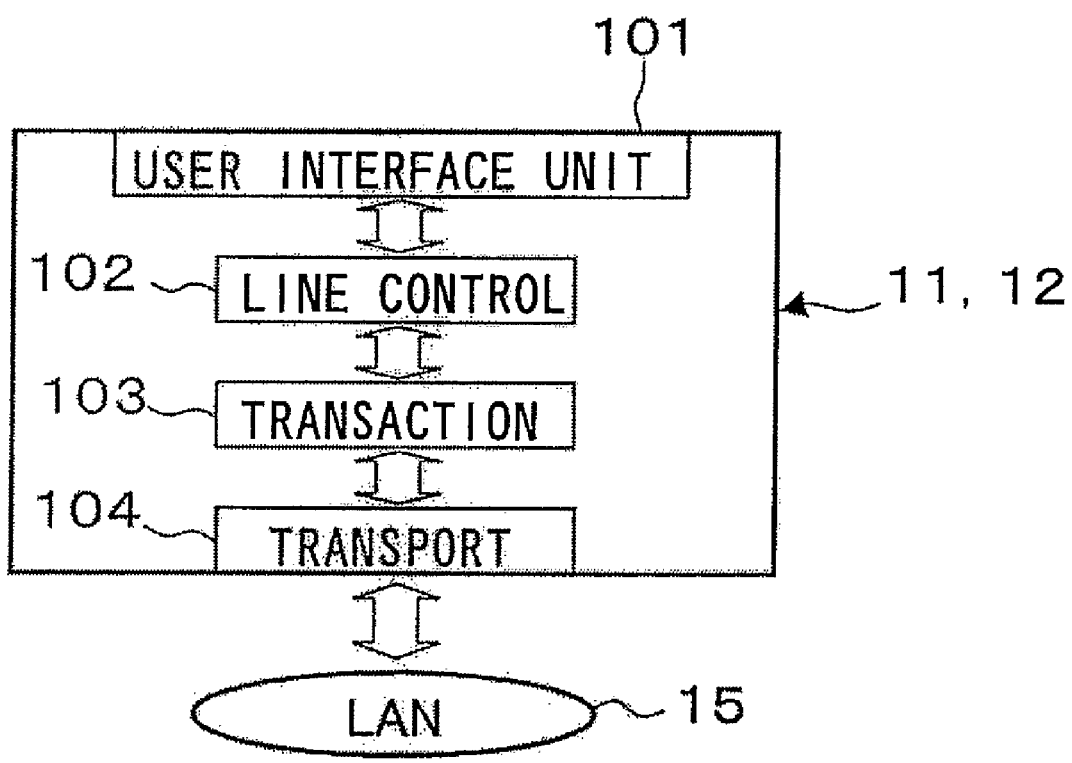
FIG. 2 is A diagram showing a functional configuration of each terminal (IP telephone) used in a conventional system.
Figure 4:
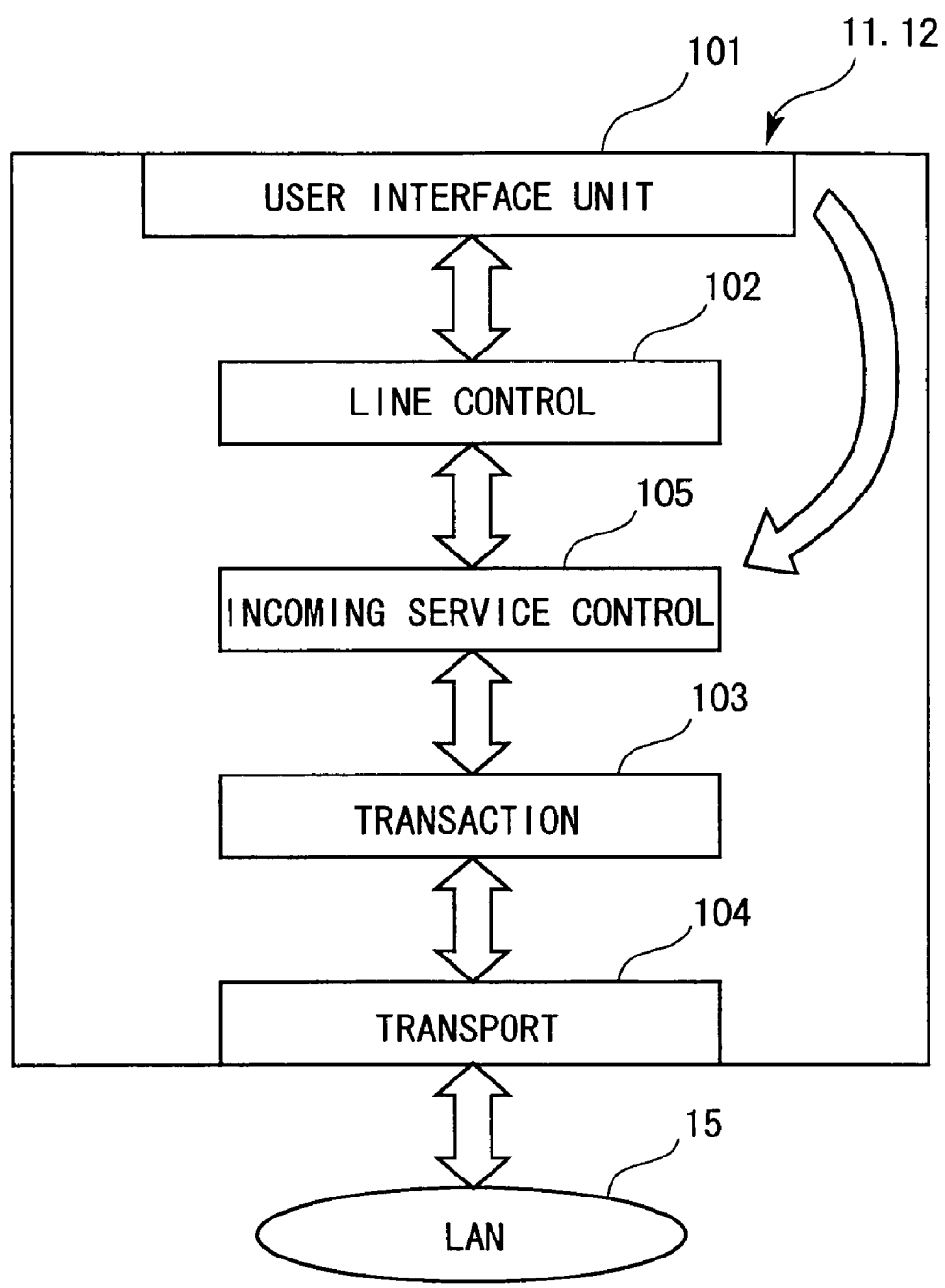
FIG. 4 is A diagram showing a functional configuration of each terminal used in a communication system according to an embodiment of the invention.

A communication system according to the embodiment of the invention is, as in the case of a conventional system, a communication system in which a so-called IP telephone is used as a communication terminal, and is constructed as shown in FIG. 1. In the communication system shown in FIG. 1, a functional configuration of each of communication terminals 11, 12 (IP telephones) connected to a LAN 15 is given as illustrated in FIG. 4. To be specific, each of the communication terminals 11, 12 includes, as the conventional communication terminal (see FIG. 2) has, a user interface unit 101, a line control unit 102, a transaction unit 103 and a transport unit 104, and, in addition, an incoming call service control unit 105 is provided between the line control unit 102 and the transaction unit 103. The incoming call service control unit 105 executes a process according to an incoming call service method, thereby generating a substitute response control message (which will hereinafter be termed PICKUP) based on a predetermined operation signal given from the user interface unit 101, sending PICKUP via the transaction unit 103 to the transport unit 104, and receiving a response message, etc. to PICKUP via the transport unit 104 and the transaction unit 103. Further, the incoming call service control unit 105 registers and updates an execution condition (a condition for the substitute response) of the incoming call service method on the basis of a command given, based on an input operation, from the user interface unit 101.

Figure 3:
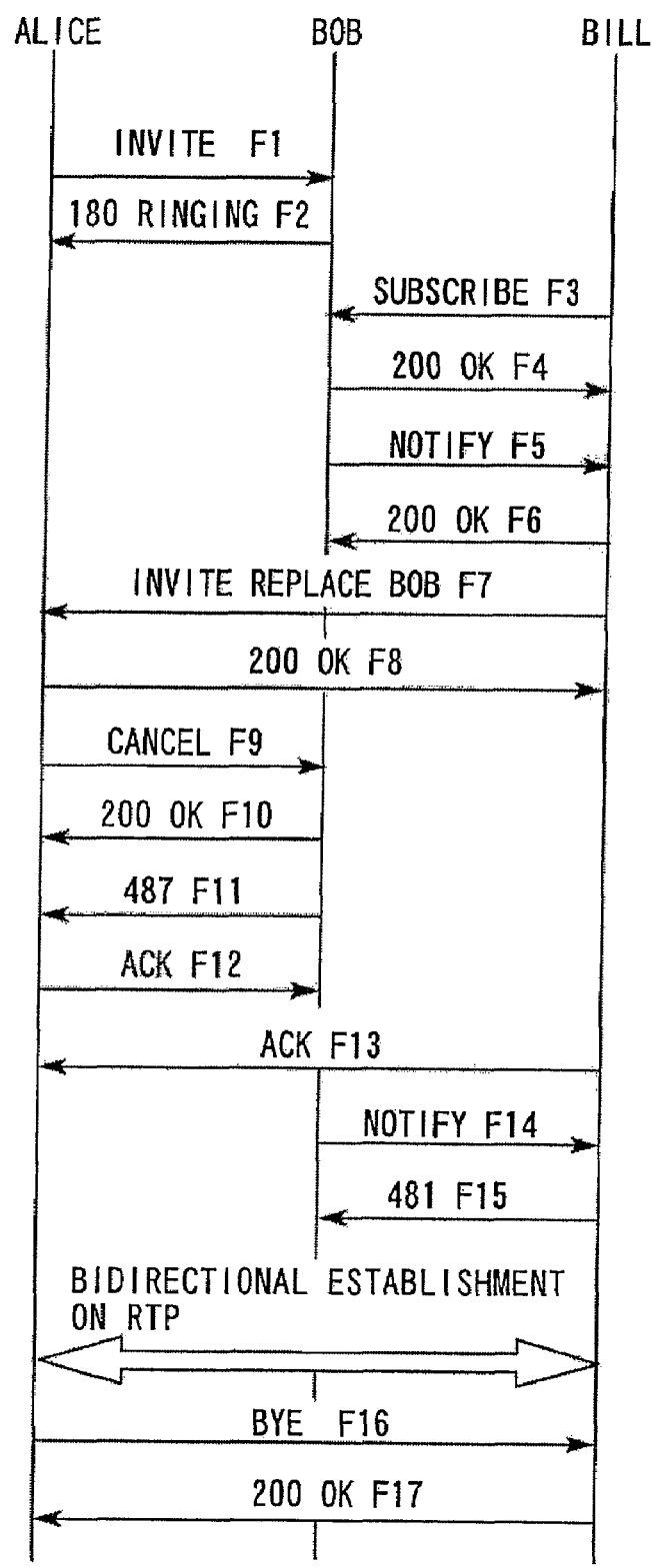
FIG. 3 is A sequence diagram showing a communication procedure in the conventional communication system.
Figure 5:
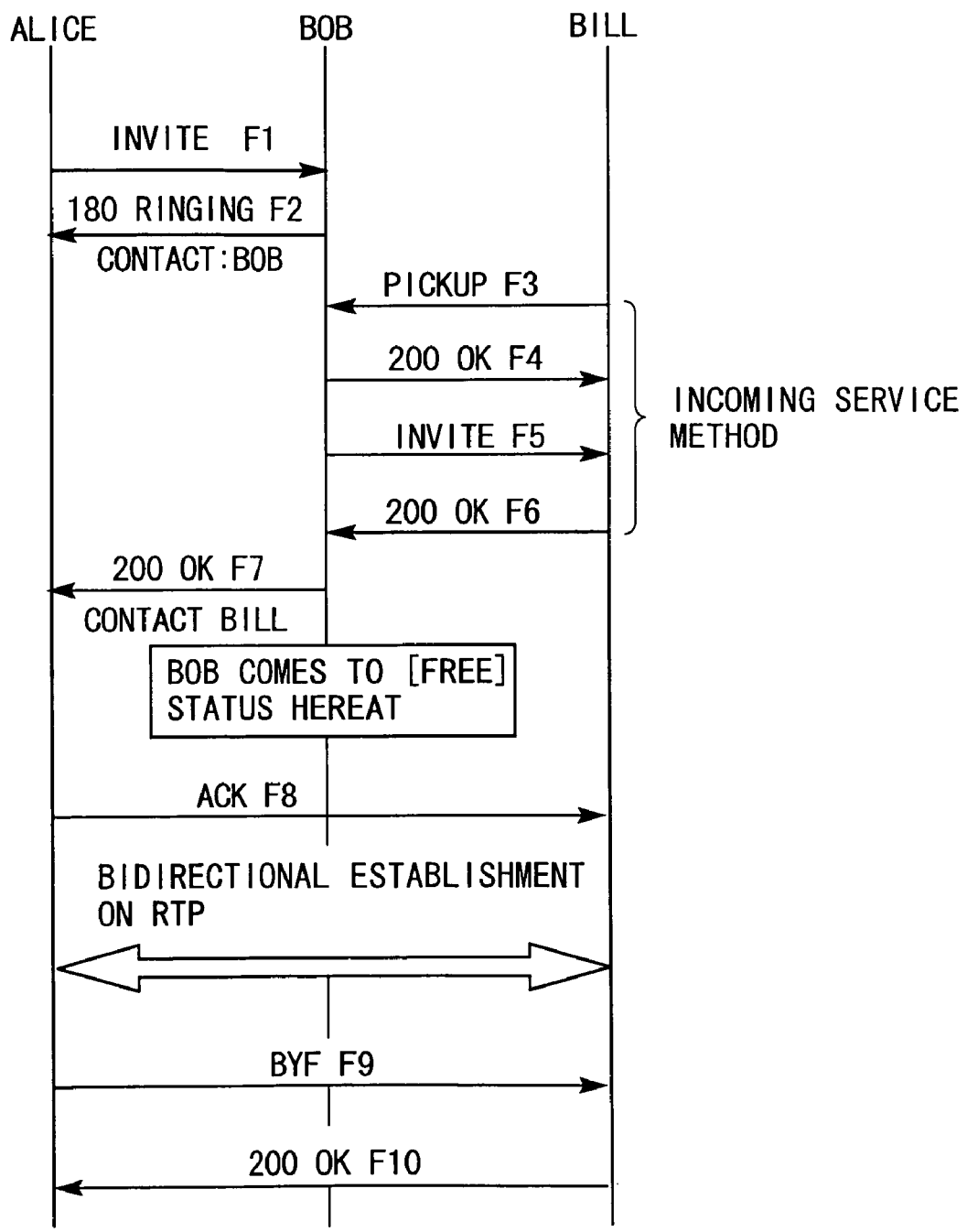
FIG. 5 is A sequence diagram showing a first example of the communication procedure in the communication system according to the embodiment of the invention.

In the communication system having such an architecture, when the communication terminal 12 makes a response to a call originating from a communication terminal 20 and reaching the communication terminal 11 (a case of the substitute response case), for example, the process is executed according to a procedure shown in FIG. 5. Note that the communication terminal 20 is named [Alice], the communication terminal 11 is named [Bob], and the communication terminal 12 is named [Bill] pursuant to the description in Non-Patent document 1 in FIG. 5 as in the example (see FIG. 3) described above.

In FIG. 5, when Bob receives an incoming message INVITE F1 from Alice, Bob sends a ringing message 180 Ringing F2 back to Alice. A ringing tone is thereby outputted at Alice, and simultaneously an incoming tone is outputted at Bob. The incoming message INVITE contains, for instance, as shown in FIG. 6, items of information such as:

Message type (INVITE sips:bob@bilox.exmaple.com SIP/2.0)
Source (Alice)
Destination (Bob)
Contact information (Contact:<sips:alice@client.atlanta.example.com>), and also contains SDP (Session Description Protocol) information describing the communication condition, etc.

In order for Bill to give the response to the incoming call to Bob in the state described above, when off-hook is done at Bill, e.g., when a pick-up button for the substitute response is operated, with this operation serving as a trigger, a request for starting an incoming message service is given from Bill, i.e., PICKUP F3 for requesting the substitute response is distributed by multicasting. This PICKUP contains, for example, as shown in FIG. 7, items of information such as:

Message type (PICKUP sips:bob@biloxi.example.com SIP/2.0)
Source (Bill)
Destination (Bob)
Contact information (Contact: <sips:bill@biloxi.example.com>)
PICKUP group (Pickup-Group: Group-A)
Priority level information (User-Priority: General (normal))
PICKUP authentication password (Pickup-Authorization: user01)
Target source information (Source-User-Agent: Alice)

It is to be noted that pieces of attribute information such as the PICKUP group, the priority level information, the PICKUP authentication password, the target source information, etc. are, as explained above, previously registered in the incoming call service control unit 105 in accordance with an input command from the user interface unit 101 of each of the communication terminals 11, 12 (Bob, Bill) connected to the LAN 15.

Referring back to FIG. 5, Bob receiving PICKUP F3 distributed by multicasting recognizes from its destination information that this message is addressed to the self-communication-terminal, and sends a receipt response 200 OK F4 thereto back to Bill. Then, Bob transfers the incoming message INVITE to Bill (INVITE F5). Bill receiving the transferred incoming message INVITE F5 sends a receipt response 200 OK F6 thereto back to Bob. Bob sends, upon receiving the receipt response 200 OK F6 to INVITE F5, a receipt response 200 OK F7 containing the contact information specifying Bill to Alice serving as a transmission source of the incoming message INVITE F1. This receipt response 200 OK F7 contains, for example, as shown in FIG. 8, items of information such as:

Message type (SIP/2.0 200 OK)
Source (Bob)
Destination (Alice)

Contact information (Contact:<sips:bill@client.biloxi.example.com>), and also contains the session information SDP (Session Description Protocol) describing the communication condition, etc.

Bob comes to a free status after sending the receipt response 200 OK F7 to Alice serving as the transmission source of the incoming message INVITE F1. Thereafter, Alice recognizes based on the contact information described in the receipt response 200 OK F7 sent from Bob that Bill is the terminal which should respond to the incoming message INVITE F1 sent as addressed to Bob, and transmits an acknowledgment notifying message ACK F8 to Bill. This acknowledgment notifying message ACK F8 contains, for instance, as shown in FIG. 9, items of information such as:

Message type (ACK sips:bob@client.biloxi.exampel.com SIP/2.0)
Source (Alice)
Destination (Bill).

When finishing the receipt and the transmission of the acknowledgment notifying message ACK F8 between Alice and Bill, a call based on RTP (Real-time Transport Protocol) is established by making negotiations mutually between Bill who is based on the SDP information (see FIG. 6) contained in INVITE F5 transferred from Bob and Alice who is based on the SDP information (see FIG. 8) contained in the receipt response 200 OK F7 given from Bob, whereby bidirectional voice communications become executable. Thereafter, when a disconnection message BYE F9 is sent to Bill from, e.g., Alice, and when Bill receiving this disconnection message BYE F9 sends a receipt response 200 OK F10 to Alice, the call between Alice and Bill is disconnected.

In the communication systems described above, when Bob receives the incoming message INVITE from Alice, Bill sends PICKUP (the substitute response control message) to Bob in accordance with the incoming service method. Then, Bob sends the incoming message INVITE to Bill, and simultaneously Bob transmits the receipt response 200 OK containing the contact information specifying Bill to Alice, whereby Bill can respond to the call given to Bob from Alice. Thus, Bill can respond (substitute response) to the call given to Bob according to comparatively a simple procedure based on the incoming call service method. According to the communication system, for example, Alice has no necessity of receiving from Bill the substitute incoming message with a purport of making the substitute response while ringing Bob (the terminal Alice has no necessity of having a three party speech function).

Note that the SDP information of Alice is contained in the incoming message INVITE in the example explained above and can be contained also in ACK F8.

Figure 10:
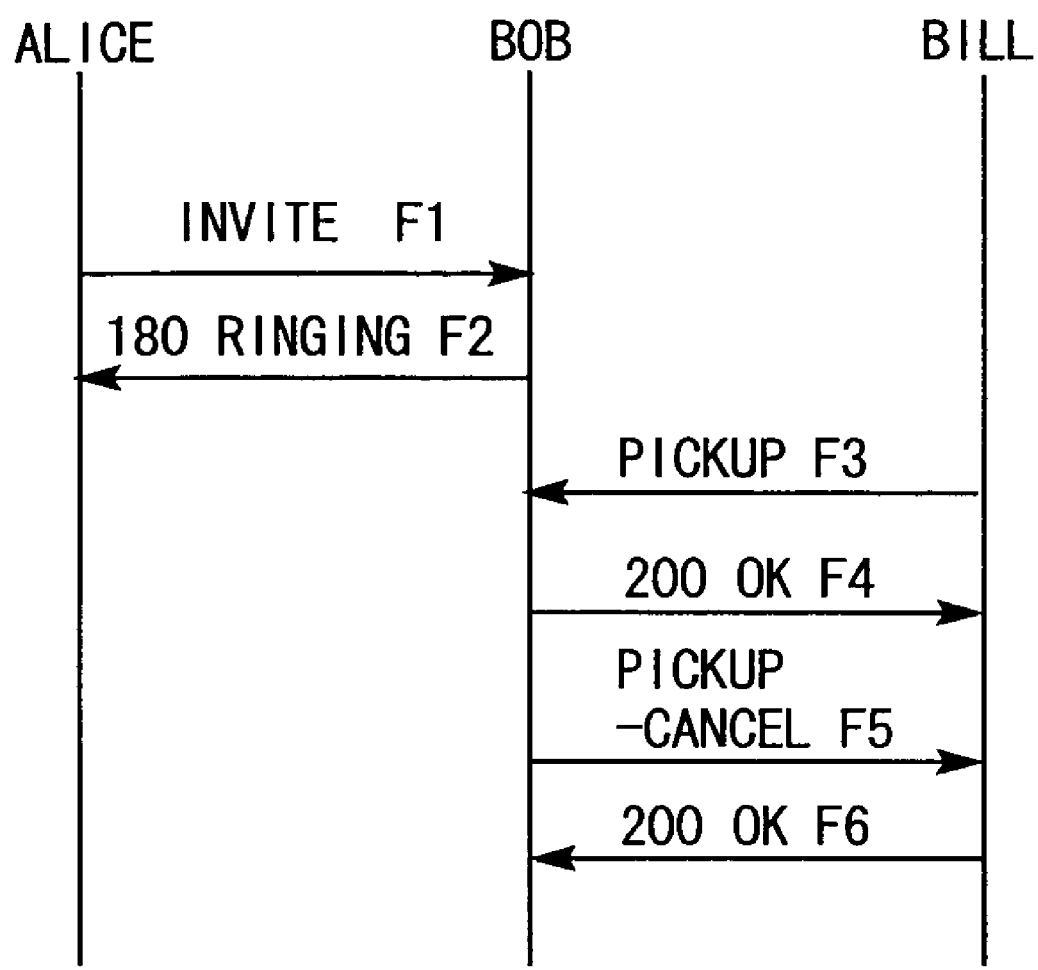
FIG. 10 is A sequence diagram showing a second example of the communication procedure in the communication system according to the embodiment of the invention.

In the communication system, Bob (the communication terminal having the substitute response performed) can also reject the substitute response by Bill. In this case, as shown in FIG. 10, Bob receiving PICKUP F3 from Bill sends to Bill a message PICKUP-CANCEL F5 for rejecting the substitute response in place of the incoming message INVITE F5 (see FIG. 5), but does not transmit the receipt response 200 OK F7 (see FIG. 5) to Alice. With this scheme, the call between Alice and Bill is not established, and the substitute response to the call given from Alice to Bob is not made by Bill.

Figure 11:
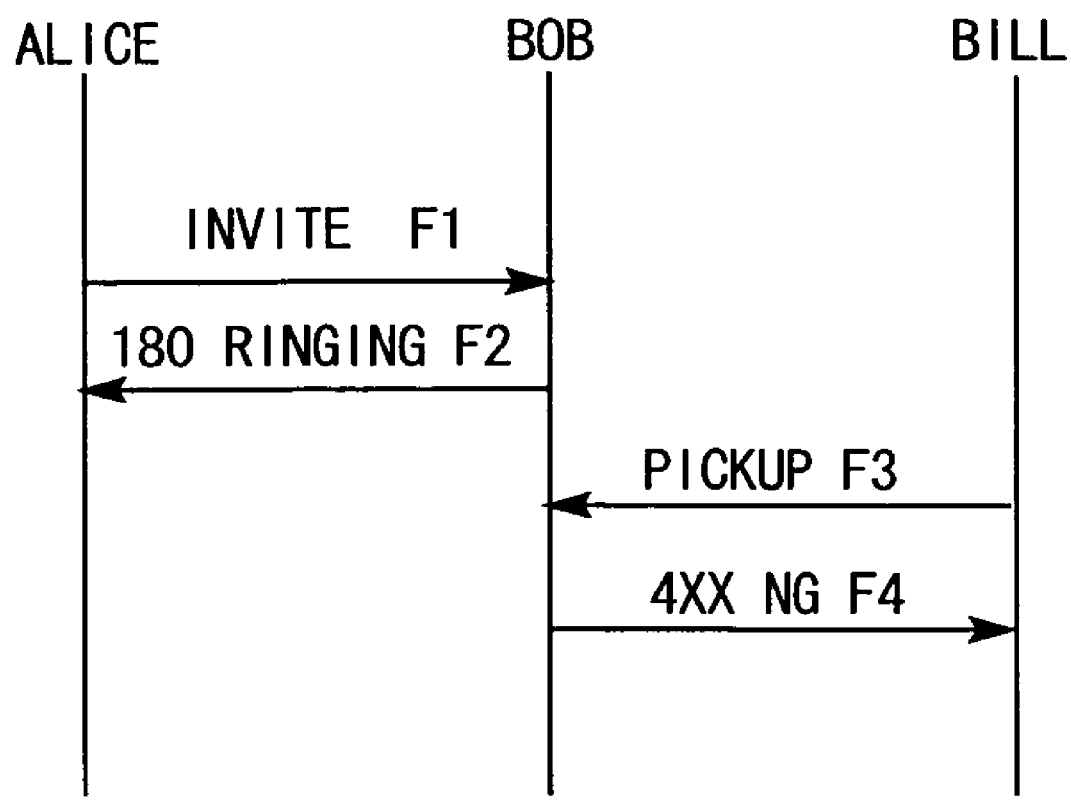
FIG. 11 is A sequence diagram showing a third example of the communication procedure in the communication system according to the embodiment of the invention.

Further, as shown in FIG. 11, Bob receiving PICKUP F3 from Bill can also, for rejecting the substitute response by Bill, send an error message 4xxNG F4 as a response message thereto back to Bill (INVITE is not transfer, either). In this case also, the call between Alice and Bill is not established, and the substitute response to the call given from Alice to Bob is not made by Bill, either.

Figure 12:
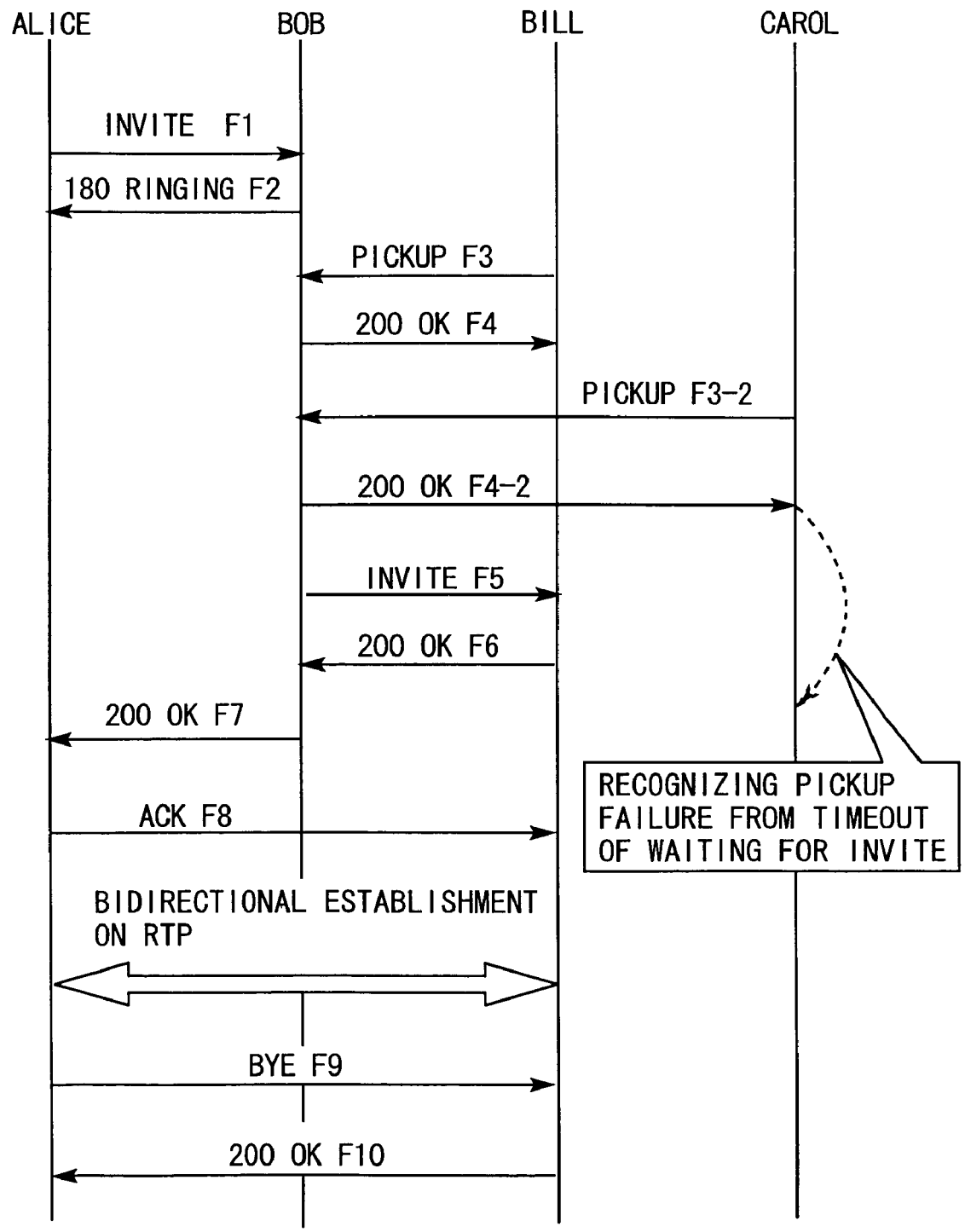
FIG. 12 is A sequence diagram showing a fourth example of the communication procedure in the communication system according to the embodiment of the invention.
Figure 13:
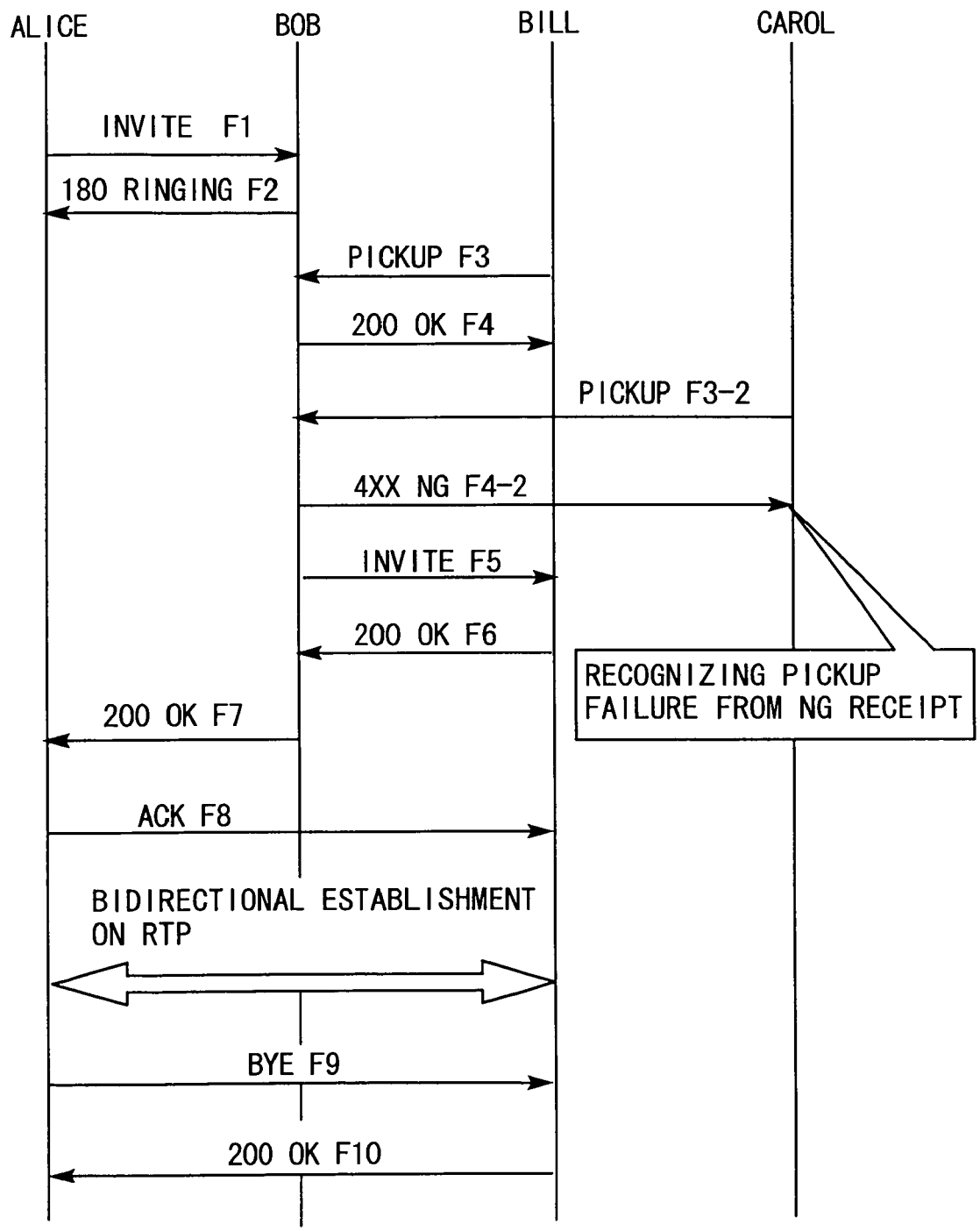
FIG. 13 is A sequence diagram showing a fifth example of the communication procedure in the communication system according to the embodiment of the invention.

Furthermore, in a case where a plurality of communication terminals within the LAN 15 distribute PICKUP by multicasting when the incoming message is sent from the source communication terminal (Alice) to the communication terminal within the LAN 15, for example, the processing is executed based on procedures shown in FIGS. 12 and 13. In the communication system concerning this example, three pieces of communication terminals (which will hereinafter be named Bob, Bill and Carol) are connected within the LAN 15.

In FIG. 12, an incoming message INVITE F1 is sent from Alice to Bob, and Bob receiving the incoming message INVITE F1 sends a ringing message 180 Ringing F2 back to Alice. Then, the off-hook is done at Bill, and the pick-up button is operated, at which time, with this operation serving as a trigger, Bill multicasts PICKUP F3. Upon receiving this PICKUP F3, Bob sends a receipt response 200 OK F4 thereto back to Bill. Further, the off-hook is similarly done at Carol, and the pick-up button is operated, at which time, with this operation serving as a trigger, Carol multicasts PICKUP F3-2. When Bob receives this PICKUP F3-2, Bob sends a receipt response 200 OK F4-2 thereto back to Carol.

If it is judged in Bob that PICKUP F3 from Bill is permitted but PICKUP 3-2 from Carol is not permitted for two pieces of messages such as PICKUP F3 and PICKUP F3-2, Bob transfers to Bill the incoming message INVITE received from Alice (INVITE F5). On the other hand, Bob keeps a non-response status to Carol. As described above, after Bob has transferred the incoming message INVITE F5 to Bill, the processing is executed based on the same procedure as the example given above has shown (see FIG. 5), and the call based on RTP is established between Alice and Bill, whereby there comes to a state in which the voice communications are mutually performed. On the other hand, Carol, there being a transfer-waiting-status for the incoming message INVITE, recognizes that a substitute response request (PICKUP) falls into a failure, if the incoming message INVITE is not transferred within a predetermined period of time (timeout).

Moreover, in an example shown in FIG. 13, when it is judged in Bob that PICKUP F3-2 from Carol is not permitted, Bob sends an error message 4xxNG F4-2 to Carol. Carol recognizes from this message that PICKUP F3-2 sent from the self-communication-terminal was rejected, and that the substitute response request fell into the failure.

Further, the communication terminal that made the substitute response request (PICKUP) also can cancel this substitute response request. In this case, the processing is executed based on a procedure shown in, e.g., FIG. 14. Note that the plurality of source communication terminals transmit the incoming messages, and the plurality of communication terminals make the substitute response requests (PICKUP) for ringing based on the incoming messages in the example shown in FIG. 14.

Figure 14:
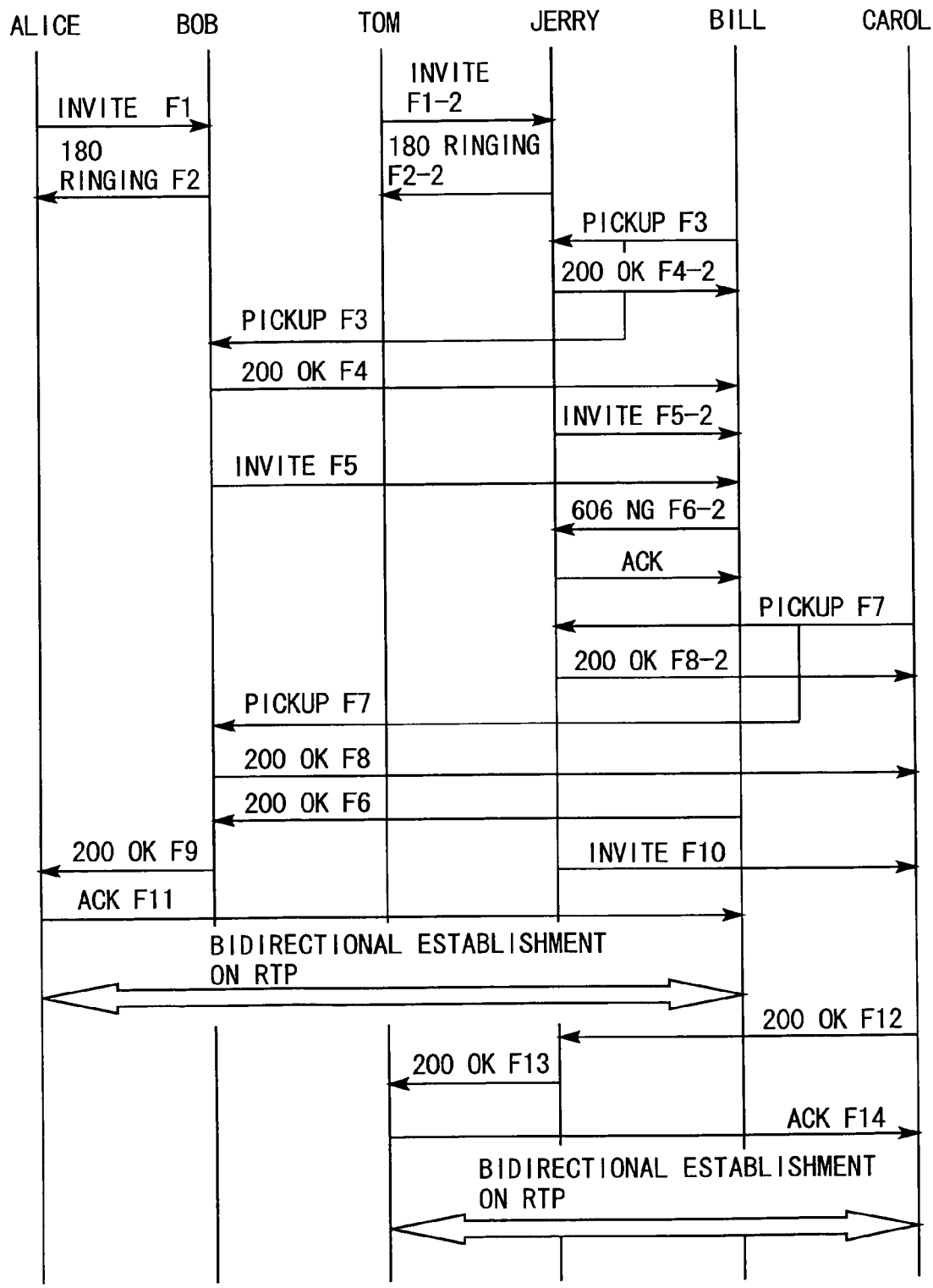
FIG. 14 is A sequence diagram showing a sixth example of the communication procedure in the communication system according to the embodiment of the invention.

In FIG. 14, Alice sends the incoming message INVITE F1 to Bob, and Bob receiving the incoming message INVITE F1 sends the ringing message 180 ringing F2 back to Alice. Further, an incoming message INVITE F1-2 from Tom is sent to Jerry, and Jerry receiving the incoming message INVITE F1-2 sends a ringing message 180 ringing F2-2 back to Tom. Then, the off-hook is done at Bill, and the pickup button is operated, at which time, with this operation serving as a trigger, Bill multicasts PICKUP F3 containing Bob and Jerry as pieces of destination information. Jerry receiving PICKUP F3 transmits to Bill a receipt response 200 OK F4-2 to PICKUP F3 addressed to the self-communication-terminal. Bob receiving PICKUP F3 transmits to Bill a receipt response 200 OK F4 to PICKUP F3 addressed to the self-communication-terminal. Then, Jerry transfers the incoming message INVITE given from Tom to Bill (INVITE F5-2), and Bob also transfers the incoming message INVITE given from Alice to Bill (INVITE F5).

Bill, to which the two incoming messages INVITE F5 and INVITE F5-2 have been transferred, for instance, when determining that a response to one incoming message INVITE F5 should be given, sends a cancel message 606 NG F6-2 to Jerry as a transfer source of the other incoming message INVITE F5-2. Jerry receiving this cancel message 606 NG F6-2 sends an acknowledgment notifying message ACK back to Bill.

Furthermore, the off-hook is done at Carol, and the pickup button is operated, at which time, with this operation serving as a trigger, Carol multicasts PICKUP F7 containing Bob and Jerry as pieces of destination information. Jerry receiving PICKUP F7 transmits to Carol a receipt response 200 OK F8-2 to PICKUP F7 addressed to the self-communication-terminal. Bob receiving PICKUP F7 transmits to Carol a receipt response 200 OK F8 to PICKUP F7 addressed to the self-communication-terminal.

Bill has sent the cancel message 606 NG F6-2 with respect to the transfer of the incoming message INVITE F5-2 from Jerry, and therefore transmits to Bob a receipt response 200 OK F6 to the incoming message INVITE F5 transferred from Bob. Bob receiving this receipt response 200 OK F6 sends a receipt response 200 OK F9 containing the contact information specifying Bill to Alice serving as an originator (source) communication terminal of the incoming message INVITE F1 (INVITE F5). Alice receiving this receipt response 200 OK F9 transmits to Bill an acknowledgment notifying message ACK F11 on the basis of the contact information contained in the receipt response 200 OK F9. The call is thereby established between Bill to which the incoming message INVITE F5 has been transferred and Alice receiving the receipt response 200 Ok F9 thereto, there comes to a state in which the voice communications based on RTP can be performed.

On the other hand, Jerry has received from Bill the cancel message 606 NG F6-2 about the transfer of the incoming message INVITE F5-2, and therefore sends to Carol the incoming message INVITE given from Tom (INVITE F10). Carol, there being no response to pickup f7 from Bob, when confirming the timeout, sends to Jerry a receipt response 200 OK F12 to the incoming message INVITE F10 transferred from Jerry. Jerry receiving this receipt response 200 OK F12 transmits a receipt response 200 OK F13 containing the contact information specifying Carol to Tom serving as a source communication terminal of the incoming message INVITE F1-2 (INVITE F10). Tom receiving this receipt response 200 OK F13 sends to Carol an acknowledgment notifying message ACK F14 on the basis of the contact information contained in the receipt response 200 OK F13. The call is thereby established between Carol to which the incoming message INVITE F10 has been transferred and Tom receiving the receipt response 200 OK F13 thereto, whereby there comes to a state in which the voice communications based on RTP can be conducted.

Through the procedures described above, Bill as a surrogate for Bob makes the response to the call given to Bob from Alice, while Carol as a surrogate for Jerry makes the response to the call given to Jerry from Tom.

Figure 15:
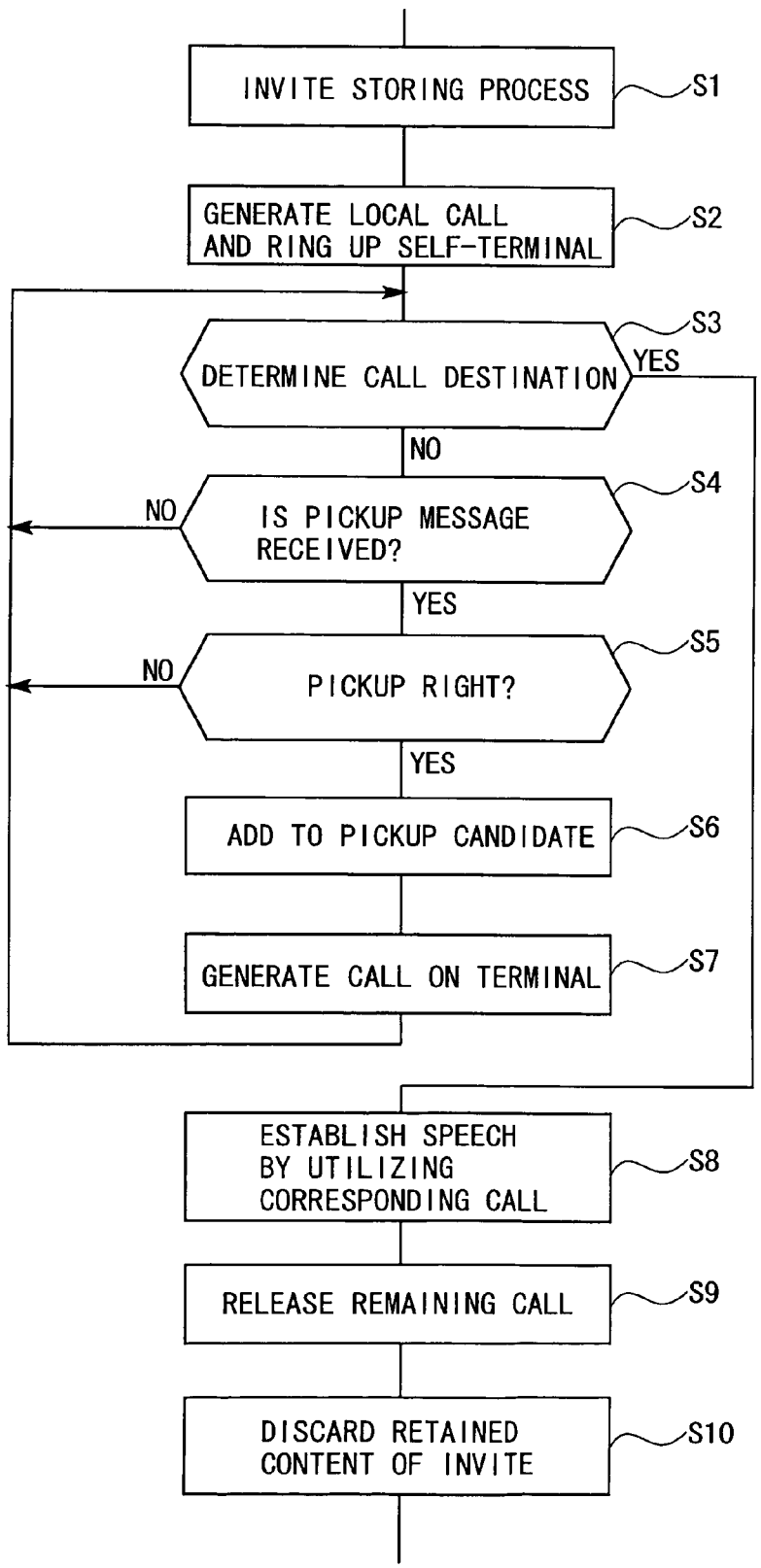
FIG. 15 is A flowchart showing a first example of a processing procedure on the communication terminal in the communication system according to the embodiment of the invention.

In the communication system explained above, the communication terminal (e.g., Bob) receiving the incoming message INVITE from the source communication terminal (e.g., Alice) and having the substitute response performed by other communication terminal, can execute the processing based on, specifically, a procedure shown in FIG. 15. This type of procedure can be actualized as, for example, a computer program on a CPU mounted in the communication terminal.

In FIG. 15, the communication terminal (e.g., Bob) stores the incoming message INVITE (see FIG. 6) received from the source communication terminal (e.g., Alice) (S1), then generates a call for a local network (e.g., the LAN 15) and simultaneously effects ringing of the self-terminal (S2).

Thereafter, the communication terminal judges whether or not there is determined other communication terminal making the substitute response (which will hereinafter be referred to as a transfer destination of the incoming message, or might be properly called a PICKUP terminal) (S3). The communication terminal has judged whether or not the PICKUP message was received (S4) in a state where this PICKUP terminal is not yet determined (NO in S3), and, when receiving the PICKUP message (YES in S4), further judges by referring to the PICKUP message whether, with the communication terminal serving as a source of this PICKUP message being set as a candidate (a PICKUP candidate terminal) for the communication terminal making the substitute response, this PICKUP candidate terminal has a right of the substitute response or not (S5). This judging process will be explained later on (see FIG. 16). When judging that the PICKUP candidate terminal has the right of the substitute response (YES in S5), the communication terminal registers the PICKUP candidate terminal as a normal PICKUP candidate terminal in a list (S6), and generates a call to the thus-registered PICKUP candidate terminal (S7). Then, the communication terminal repeatedly executes the processes (S3 through S7) described above, and, in the process of the execution thereof, adds the PICKUP candidate terminal as the normal PICKUP candidate terminal to the list each time the communication terminal receives the PICKUP message from the PICKUP candidate terminal having the right of the substitute response (NO in S3, YES in S4 and YES in S5) (S6), and generates the call to the registered PICKUP candidate terminal (S7).

Then, when a predetermined period of time has elapsed since the receipt of, e.g., INVITE, the PICKUP terminal that should make the substitute response is determined from within the PICKUP candidate terminals registered in the list. For instance, the PICKUP candidate terminal receiving the PICKUP message for the first time can be determined as the PICKUP terminal from within the PICKUP candidate terminals registered in the list. Further, the PICKUP candidate terminal having a highest priority level (User-Priority) can be determined as the PICKUP terminal from within the PICKUP candidate terminals registered in the list. Then, when determining the PICKUP terminal, a speech (voice communication) between the source communication terminal (e.g., Alice) of the stored incoming message INVITE and the PICKUP terminal (e.g., Bill) is established by making use of the call to the PICKUP terminal (S8). To be specific, the communication terminal transfers the incoming message INVITE to the PICKUP terminal, and simultaneously sends the receipt response 200 OK containing the contact information specifying the PICKUP terminal to the source communication terminal of the incoming message INVITE.

Thereafter, the communication terminal releases the call with respect to the PICKUP candidate terminals each determined not to be the PICKUP terminal (S9), and simultaneously discards a retained content of the incoming message INVITE (S10).

Figure 16:
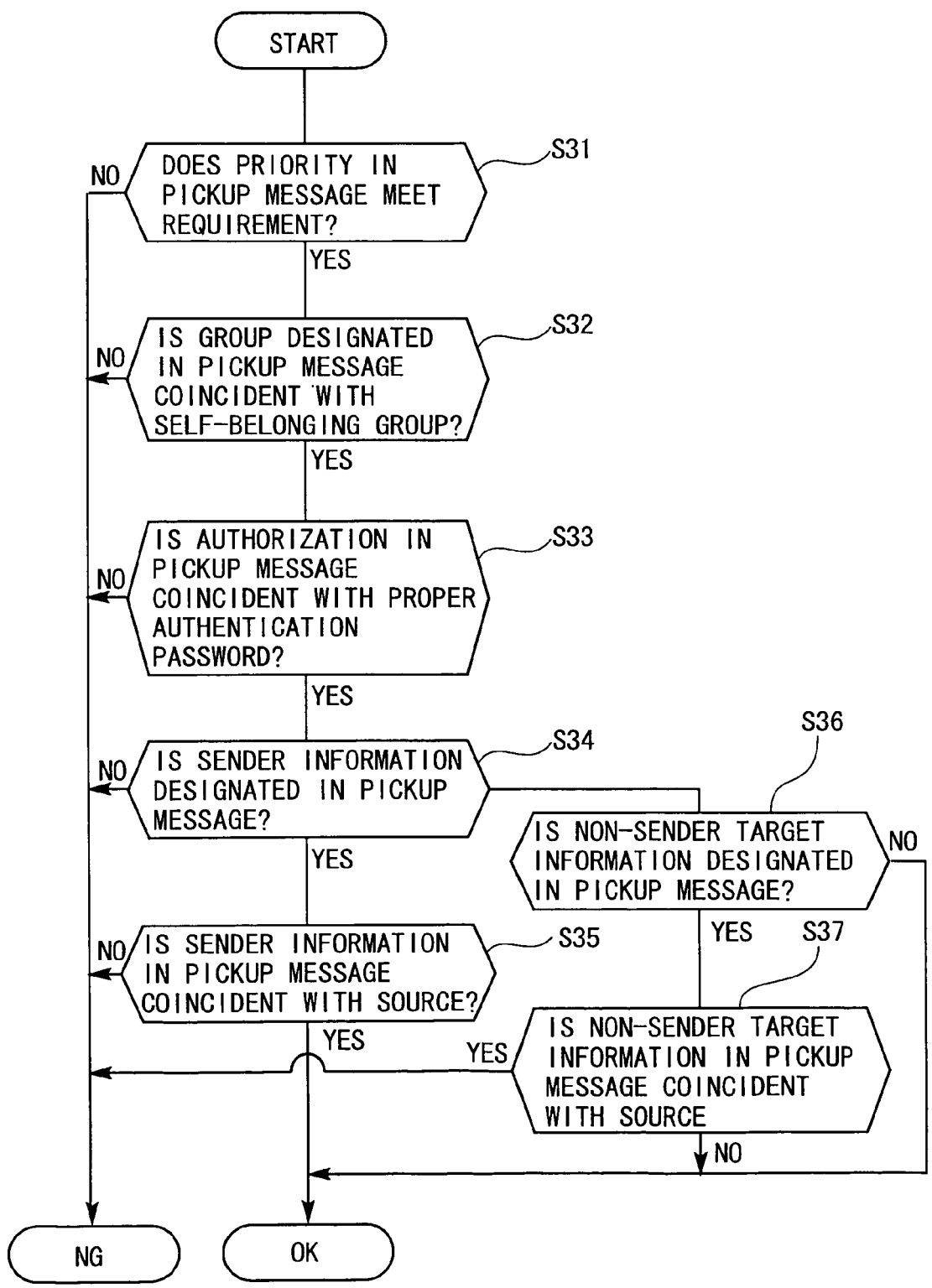
FIG. 16 is A flowchart showing a processing procedure for determining a communication terminal making a substitute response.

The judging process (S5) of judging whether the PICKUP candidate terminal has the right of the substitute response is executed based on a procedure shown in, e.g., FIG. 16.

Made are a judgment (S31) as to whether or not the priority level (User-Priority) contained in the PICKUP message (see FIG. 7) meets the requirement, a judgment (S32) as to whether or not a group (Pickup-Group) contained in the PICKUP message is coincident with a group belonging to the self-communication-terminal, and a judgment (S33) as to whether or not an authentication password (Pickup-Authorization) contained in the PICKUP message is a valid authentication password. If a negative judgment result is obtained in any one of the judgments, the PICKUP candidate terminal serving as a source of the PICKUP message is excluded from the PICKUP candidate terminals eligible to become the PICKUP terminal, i.e., from the PICKUP candidate terminals that should be registered in the list (NG).

Still further, it is judged whether or not target source information (Source-User-Agent) defined as sender information for specifying a substitute response target source communication terminal is designated in the PICKUP message (see FIG. 7) (S34), and, if the target source information is designated therein (YES in S34), there is made a judgment as to whether the source communication terminal specified by the target source information is actually coincident with the communication terminal which is a source of the incoming message INVITE (S35). Then, when judging that the source communication terminal specified by the target source information is not actually coincident with the communication terminal which is the source of the incoming message INVITE (NO in S35), the PICKUP candidate terminal as the source of the PICKUP message containing the target source information is excluded from the PICKUP candidate terminals each eligible to become the PICKUP terminal (NG).

Whereas if the target source information is not designated in the PICKUP message (NO in S34), it is further judged whether or not non-target source information defined as sender information for specifying a source communication terminal that does not become the substitute response target terminal is designated in the PICKUP message (S36). Note that the non-target source information is not designated in the PICKUP message shown in FIG. 7. If the non-target source information is designated therein (YES in S36), it is judged whether or not the source communication terminal specified by the non-target source information is in fact coincident with the communication terminal which is the source of the incoming message INVITE (S37). Then, when judging that the source communication terminal specified by the non-target source information is in fact coincident with the communication terminal as the source of the incoming message INVITE (YES in S37), the PICKUP candidate terminal as the source of the PICKUP message containing the non-target source information is excluded from the communication terminals each eligible to become the PICKUP terminal (NG).

In the processes according to the procedure described above, if affirmative judgment results are obtained in all the judgments in S31 through S35, or if a negative judgment result is acquired in the judgment in S36, or if the affirmative judgment result is obtained in the judgment in S36 and if a negative judgment result is acquired in the judgment in S37, the PICKUP candidate terminal as the source of the PICKUP message can become the PICKUP terminal, i.e., the PICKUP candidate terminal that should be registered in the list.

Figure 17:
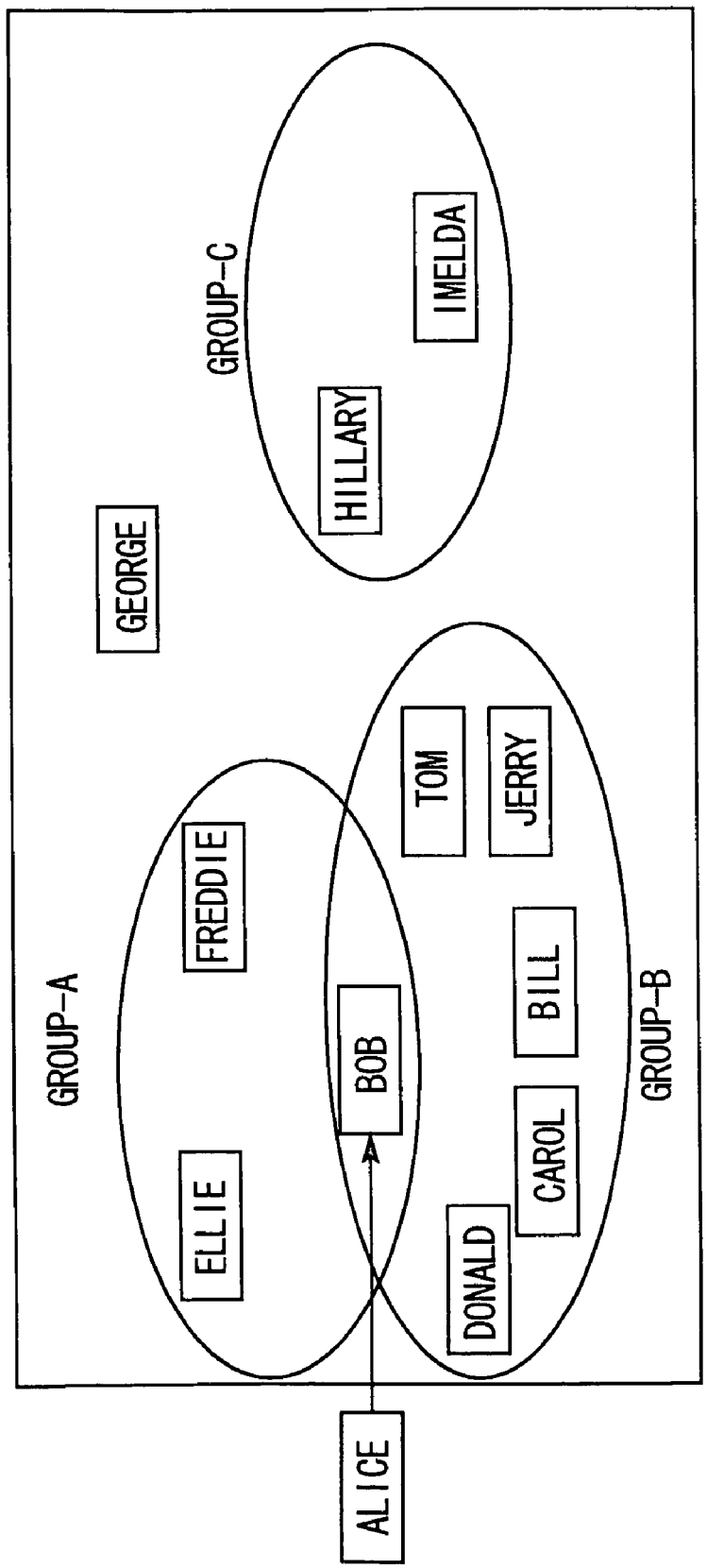
FIG. 17 is A diagram showing one example of separating into groups the communication terminals included in the communication system according to the embodiment of the invention.

The respective communication terminals connected to the LAN 15 in the communication system (see FIG. 1) can be arbitrarily separated into groups. For instance, as illustrated in FIG. 17, eleven pieces of communication terminals Bob, Donald, Carol, Bill, Tom, Jerry, Ellie, Freddie, George, Hillary and Imelda residing in the same segment in the LAN 15 are separated such that the communication terminals Ellie, Freddie and Bob belong to a group A, the communication terminals Bob, Donald, Carol, Bill, Tom and Jerry belong to a group B, the communication terminals Hillary and Imelda belong to a group C, and George belongs to none of these groups. In this case, the ringing based on the incoming message INVITE given to Bob belonging to both of the group A and the group B from Alice can be accepted for the substitute response (PICKUP) by Ellie and Freddie belonging to the group A and by Donald, Carol, Bill, Tom and Jerry belonging to the group B (refer to the judging process in S32 shown in FIG. 16).

Figure 18:
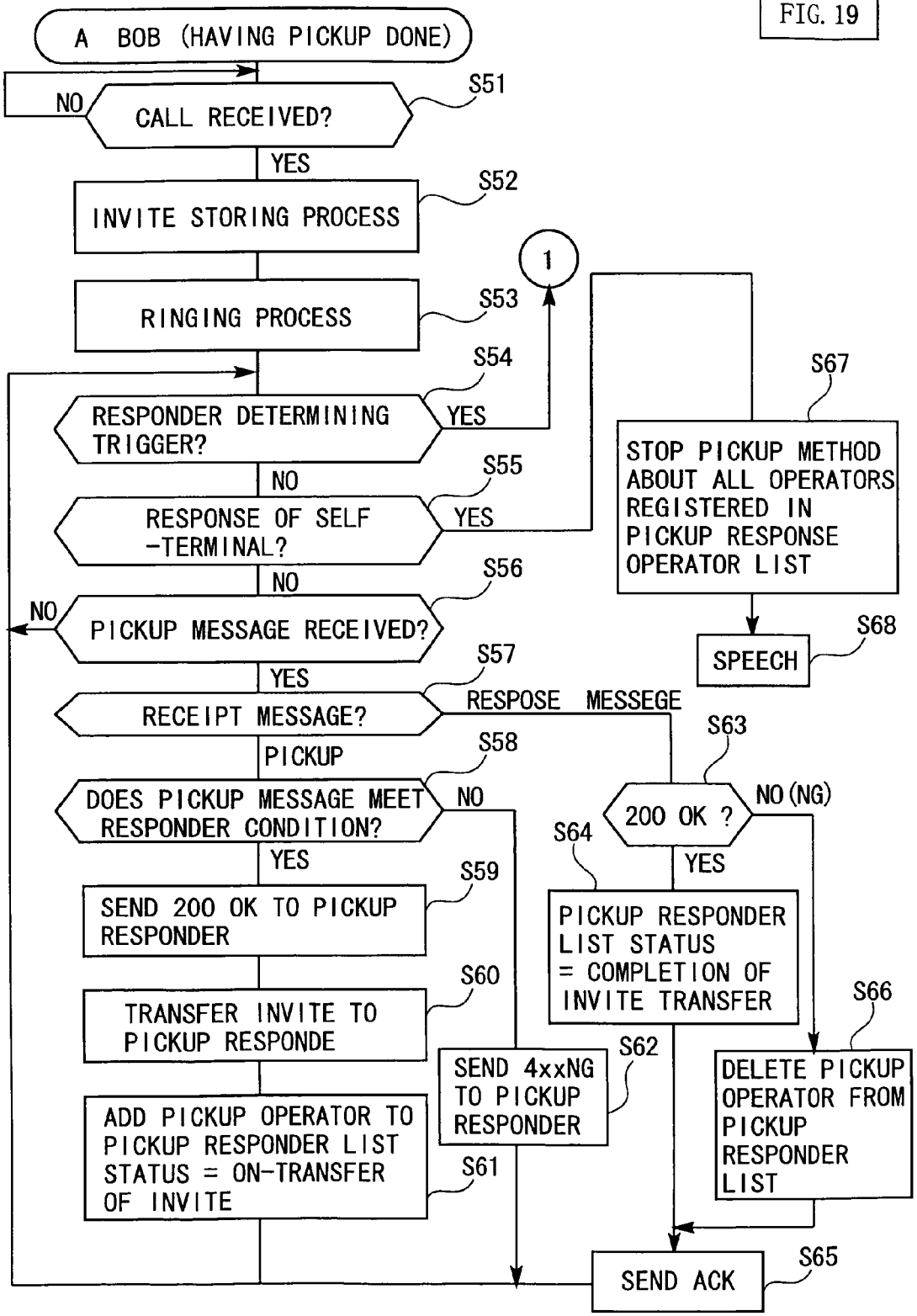
FIG. 18 is A flowchart showing a second example (part 1) of the processing procedure on the communication terminal in the communication system according to the embodiment of the invention.

In the communication system described above, the communication terminal (e.g., Bob) receiving the incoming message INVITE from the source communication terminals (e.g., Alice) and having the substitute response conducted by other communication terminal, can further execute the processing based on a procedure shown in FIG. 18. This type of procedure can be actualized as, for example, a computer program on the CPU mounted in the communication terminal.

In FIG. 18, the communication terminal (e.g., Bob) judges whether there is the incoming message INVITE or not (S51). In this state, when the communication terminal, when receiving the incoming message INVITE from the source communication terminal (e.g., Alice), stores this incoming message INVITE (S52), and executes the ringing process in the self-communication-terminal (S53). The communication terminal judges whether or not there was a trigger for determining the communication terminal that should make the substitute response (S54). This judgment is made by judging whether or not, for instance, a predetermined period of time has elapsed since the receipt of the incoming message INVITE. When judging that there was no trigger for determining the communication terminal that should make the substitute response (NO in S54), the communication terminal judges whether or not the response operation (the off-hook operation) is done at the self-communication-terminal (S55). When judging that the response operation is not done at the self-communication-terminal (NO in S55), the communication terminal further judges whether the PICKUP message is received or not (S56). In a state of receiving no PICKUP message (NO in S56), the processes (S54 through S56) are repeatedly executed.

When judging that the PICKUP message has been received in the process of this execution (YES in S56), and if the received message is judged to be the PICKUP message (S57), it is judged based on this PICKUP message whether or not the communication terminal as a source of the PICKUP message meets a condition for making the substitute response (S58: corresponding to the judging process in S5 in FIG. 15). This judging process is executed by, specifically, the procedure shown in FIG. 16 as explained above. When judging that the communication terminal as the source of the PICKUP message meets the condition for making the substitute response (YES in S58), a receipt response 200 OK to the PICKUP message is sent to the communication terminal (S59), and subsequently the incoming message INVITE stored is transferred to this communication terminal (S60). Thereafter, the communication terminal as the source of the PICKUP message is registered as the PICKUP candidate terminal in the list, and an on-transfer status (=On-Transfer INVITE) representing that the incoming message INVITE is on its transfer, is recorded with the on-transfer status being associated with that PICKUP candidate terminal (S61).

Subsequently, when receiving, in the course of the processes (S54 through S61) described above, a response message from the communication terminal to which the incoming message INVITE (S57) has transferred, it is judged whether this response message is the receipt response 200 OK or not (S63). When judging that the response message is the receipt response 200 OK (YES in S63), a status of the PICKUP candidate terminal associated in the list with the communication terminal as the source of this receipt response 200 OK, is rewritten into a status (=INVITE Transfer Completed) representing completion of the transfer of the receipt message INVITE (S64). Then, an acknowledgment notifying message ACK is sent to this PICKUP candidate terminal (S65).

While on the other hand, if the communication terminal as the source of the PICKUP message has transmitted a substitute response (PICKUP) cancel message, it is judged that the receipt message is not the receipt response 200 OK (NO in S63), and the PICKUP candidate terminal associated with the communication terminal as the source of the cancel message is deleted from the list (S66).

The processes (S54 through S61, S63 through S65, and S66) described above are repeatedly executed. In the process of this execution, if it is judged that the communication terminal as the source of the PICKUP message does not meet the condition for making the substitute response (NO in S58), an error message 4xx NG is sent to this communication terminal, whereby the substitute response request is rejected.

It should be noted that when the response operation is done at the self-communication terminal (YES in S55) after the incoming message INVITE has been received, a stopping process of the incoming call service method (substitute response) is executed upon all the PICKUP candidate terminals registered in the list, and all the PICKUP candidate terminals registered in the list are deleted (S67). Then, the call between the communication terminal and the source communication terminal of the incoming message INVITE is established, whereby there comes to a state in which the voice communications can be performed (S68).

Figure 19:
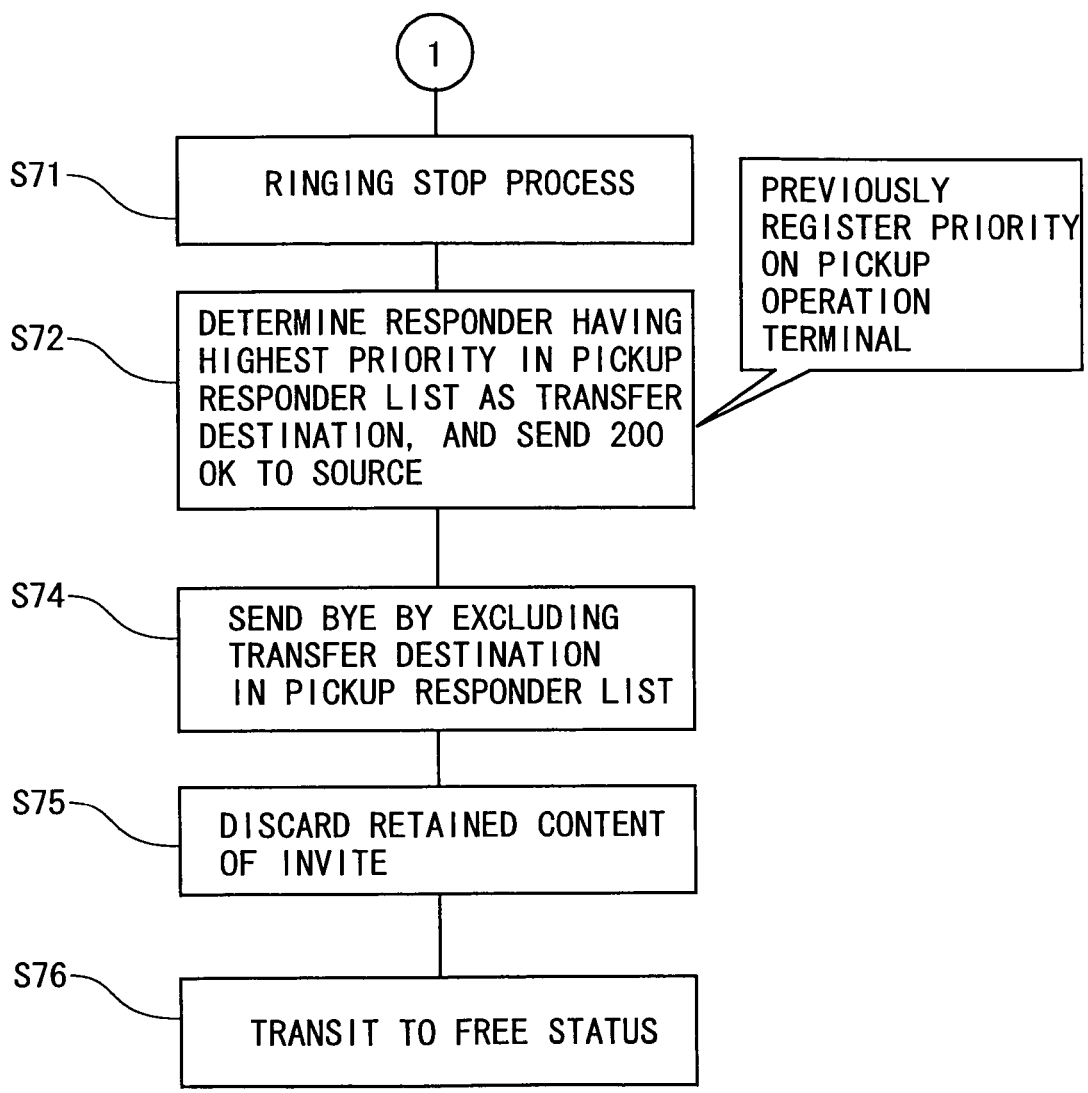
FIG. 19 is A flowchart showing the second example (part 2) of the processing procedure on the communication terminal in the communication system according to the embodiment of the invention.

Moreover, in the course of the processes described above, a predetermined period of time has elapsed since the receipt of the incoming message INVITE, and it is judged that there occurs a trigger for determining the communication terminal that should make the substitute response (YES in S54), at which time the operation proceeds to processes shown in FIG. 19. To begin with, the ringing process based on the incoming message INVITE is stopped (S71). Subsequently, there is checked the priority level information (User-Priority) contained in the PICKUP message sent from each of the PICKUP candidate terminals registered in the list, the PICKUP candidate terminal which is the source of the PICKUP message containing the priority level information exhibiting the highest priority level, is determined as the PICKUP terminal that should make the substitute response, and the receipt response 200 OK containing the contact information for specifying the PICKUP terminal is transmitted to the source communication terminal of the incoming message (S72).

Then, the incoming message INVITE, which has already been sent to each of the PICKUP candidate terminals, is invalidated by transmitting a release message BYE to the PICKUP candidate terminals other than the terminal determined as the PICKUP terminal (S74). Thereafter, the retained content of the incoming message INVITE is discarded (S75), and the communication terminal transits to a free status (S76).

Figure 20:
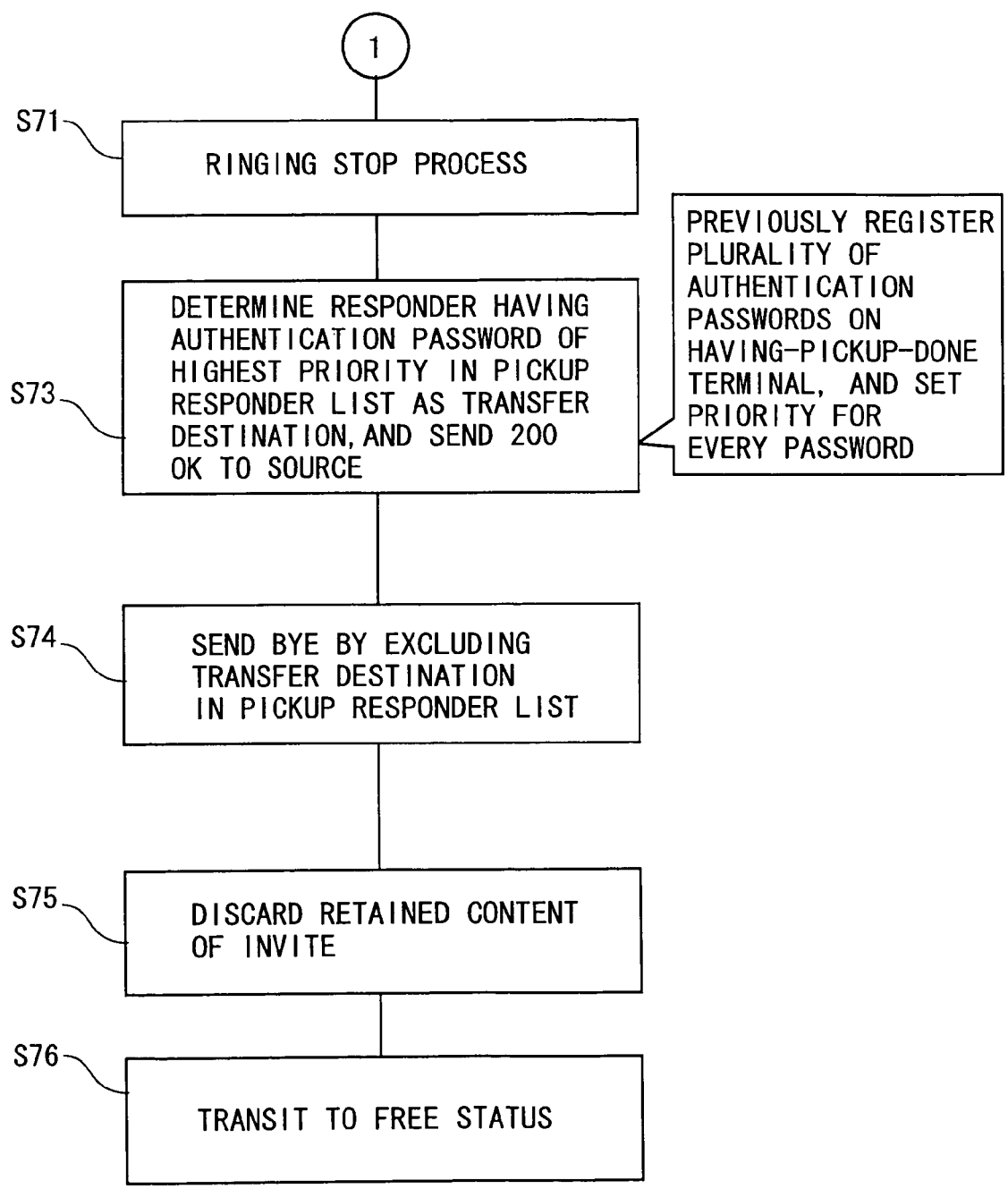
FIG. 20 is A flowchart showing a modified example of the processing procedure shown in FIG. 19.

For example, in the case of previously registering a plurality of authentication passwords by operating the user interface unit 101 on the communication terminal (the communication terminal (e.g., Bob) having the substitute response conducted) and setting the priority levels in the respective authentication passwords, the communication terminal that should make the substitute response can be determined based on a processing procedure shown in FIG. 20, which replaces the processing procedure shown in FIG. 19. More specifically, in place of the process in S72 in FIG. 19, there are checked the priority levels set in the authentication passwords (Pickup-Authorization) contained in the PICKUP messages sent respectively from the PICKUP candidate terminals registered in the list, whereby the PICKUP candidate terminal which is the source of the PICKUP message containing the authentication password exhibiting the highest priority level, is determined to be the PICKUP terminal that should make the substitute response (S73).

Note that the process shown in FIG. 18 is that the communication terminal (Bon in the example given above) having the substitute response performed temporarily transfers the incoming message INVITE from the source communication terminal (e.g., Alice) to the PICKUP candidate terminal that meets the predetermined condition. Then, thereafter, the communication terminal [Bob] getting the substitute response performed, after determining the response terminal upon a trigger for determining the responder, sends the release message BYE to the PICKUP candidate terminals other than the response terminal, thereby invalidating the already-transferred incoming message INVITE. In place of this process, however, the communication terminal Bob getting the substitute response performed, after determining the response terminal upon the trigger for determining the responder, may transfer to the response terminal the incoming message INVITE from the source communication terminal (e.g., Alice).

Figure 21:
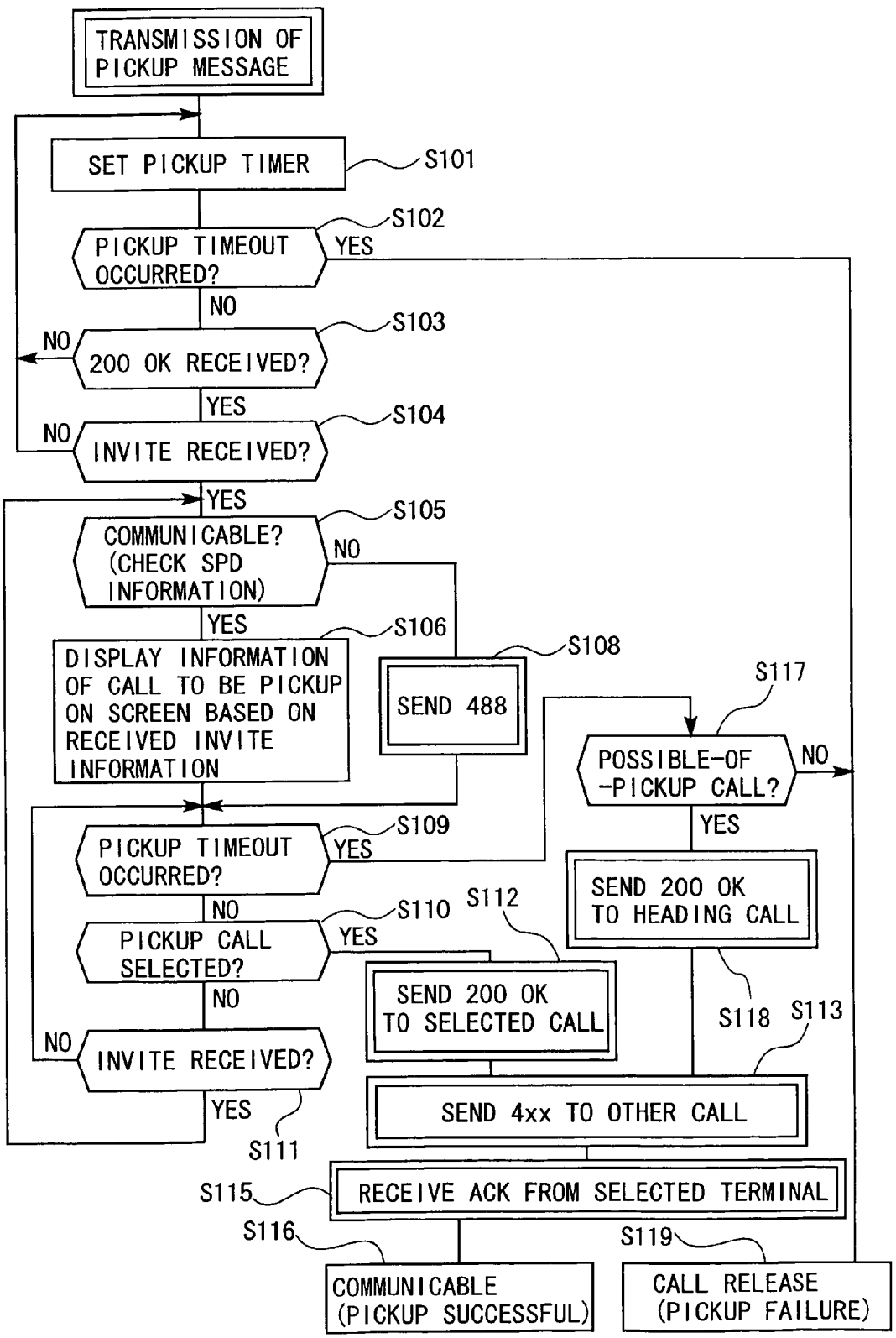
FIG. 21 is A flowchart showing a third example of the processing procedure on the communication terminal in the communication system according to the embodiment of the invention.

The processes (FIGS. 18, 19 and 20) described above are the processes, which are, upon receiving the incoming message INVITE from the source communication terminal (e.g., Alice), executed on the communication terminal (e.g., Bob) having the substitute response performed, however, the communication terminal (e.g., Bill) making the substitute response to the ringing based on the incoming message INVITE, executes the processing according to a procedure shown in, for example, FIG. 21.

In FIG. 21, the communication terminal, after multicasting the PICKUP message by operating the pickup button, executes initial setting of a PICKUP timer (S101). Thereafter, the communication terminal judges whether the PICKUP timer comes to timeout or not (S102), judges whether or not the receipt response 200 OK is received from the communication terminal receiving the incoming message INVITE (S103), and judges whether or not the incoming message INVITE is transferred or not (S104). In this state, the receipt response 200 OK is received (corresponding to S59 in FIG. 18), and further, when judging that the incoming message INVITE is transferred (corresponding to S60 in FIG. 18) (NO in S102, YES in S103 and YES in S104), the communication terminal judges, based on the SPD information (see FIG. 6) of the source communication terminal that is contained in the incoming message INVITE transferred, whether the voice communication with the source communication terminal can be executed or not (S105).

When judging that the voice communication with the source communication terminal can be performed (YES in S105), the communication terminal gets information about a call subjected to the substitute response (PICKUP) displayed on the screen on the basis of the respective items of information (see FIG. 6) contained in the received incoming message INVITE (S106). Thereafter, the communication terminal judges whether the PICKUP timer comes to timeout or not (S109), judges whether or not the call subjected to the substitute response is selected (S110), and judges whether or not a new incoming message INVITE is transferred or not (S111). In this process, when judging that the new incoming message INVITE is transferred (YES in S111), the communication terminal judges in the same way as described above whether or not the voice communication with the source communication terminal of this incoming message INVITE can be performed (S105), and, when judging that the voice communication can be executed (YES in S105), gets the information about the call subjected to the substitute response displayed on the screen on the basis of the respective items of information contained in the incoming message INVITE (S106).

In the course of these processes (S109, S110, S111, S105 and S106), for instance, the operator conducts an operation of selecting any one of the calls displayed on the screen, and, when judging that the call subjected to the substitute response has been selected (YES in S110), the communication terminal sends the receipt response 200 OK to the communication terminal (which is the source of the incoming message) associated with the selected call (S112 corresponding to S63 in FIG. 18). Then, the communication terminal sends an error message 4xx to other call (other communication terminal) to which the incoming message INVITE is transferred (S113). Thereafter, when receiving the acknowledgment notifying message ACK from the selected communication terminal (S115 corresponding to S65 in FIG. 18), the communication terminal becomes communicable with the source communication terminal of the incoming message INVITE (S116). Namely, the communication terminal makes a response to the ringing based on the incoming message INVITE as a substitute for the other communication terminal (the selected communication terminal) receiving the incoming message INVITE (the substitute response).

Note that if the PICKUP timer comes to the timeout in the course of the processes S109, S110 and S111) described above (YES in S109), the communication terminal, judges whether there is a possible-of-substitute-response call at that point of time as the result of receiving the transfer of the incoming message INVITE or not (S117), and, when judging that there is this type of call (YES in S117), sends the receipt response 200 OK to the communication terminal serving as the source of the incoming message INVITE received for the first time (S118 corresponding to S63 in FIG. 18). Thereafter, the communication terminal sends in the same way as described above the error message 4xx to other call (S113), and, when receiving the acknowledgment notifying message ACK from the communication terminal serving as a destination of the receipt response 200 OK (S115), it is possible to perform the communication with the source communication terminal of the incoming message INVITE received for the first time (S116).

While on the other hand, when judging that there is not the possible-of-substitute-response call (NO in S117), a call release process (S119) is executed.

Further, in the course of the process described above, if it is judged based on the incoming message INVITE that the communication with the source communication terminal of the incoming message can not be performed (NO in S105), a message 488 purporting that the substitute response can not be made (NO in S105) is transmitted (S108 corresponding to S63 and S66 in FIG. 18). Moreover, after sending the PICKUP message, in a state where there is neither the receipt of the receipt response 200 OK nor the transfer of the incoming message INVITE (NO in S103, or, YES in S103 and NO in S104), when the PICKUP timer comes to the timeout (YES in S102), this implies that the substitute response request is not permitted, and then the call release process (S119) is executed.

Still further, in the communication system including the plurality of communication terminals, the communications based on procedures shown in, for instance, FIGS. 22 through 25 can be conducted.

Figure 22:
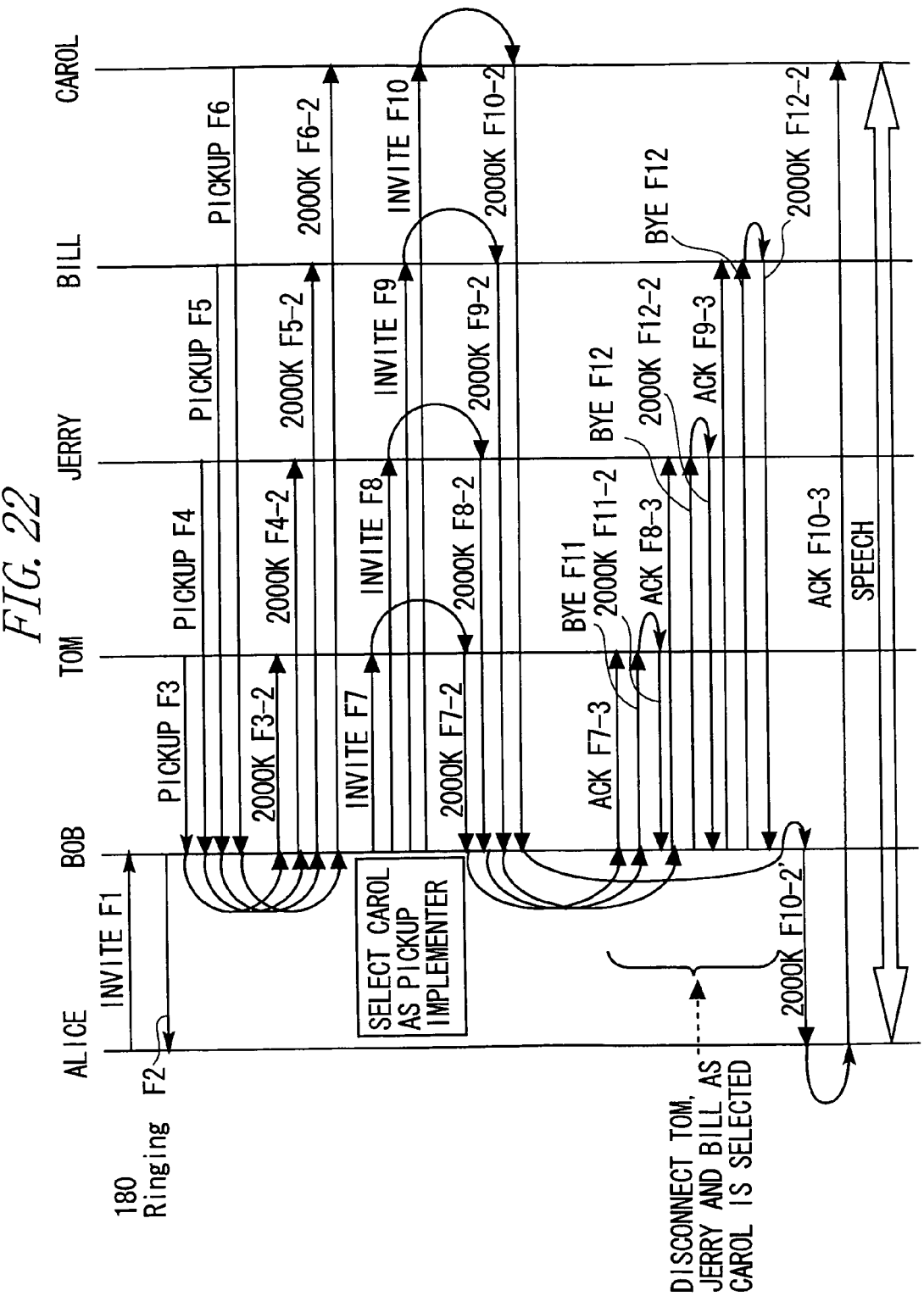
FIG. 22 is A sequence diagram showing a seventh example of the processing procedure in the communication system according to the embodiment of the invention.

An example shown in FIG. 22 represents a case wherein five pieces of communication terminals (Bob, Tom, Jerry, Bill and Carol) are included in the same segment (corresponding to the LAN 15 shown in FIG. 1), and Bob receives the incoming message INVITE from the communication terminal Alice.

In FIG. 22, Bob receives an incoming message INVITE F1 from Alice, and Bob sends a ringing message 180 Ringing F2 back to Alice. A ringing tone is thereby outputted at Alice, and simultaneously an incoming tone is outputted at Bob (refer to S53 in FIG. 18). In this state, the respective communication terminals such as Tom, Jerry, Bill and Carol multicast PICKUP F3 through PICKUP F6 addressed to Bob. Bob receiving PICKUP F3 through PICKUP F6 sends receipt responses 200 OK F3-2 through 200 OK F6-2 back to Tom, Jerry, Bill and Carol (refer to S56 through S59 in FIG. 18), and further transfers incoming messages INVITE F7 through INVITE F10 (refer to S60 in FIG. 18).

Tom, Jerry, Bill and Carol, receiving the receipt response 200 OK, to which the incoming message INVITE has been transferred, send receipt responses 200 OK F7-2 through 200 OK F10-2 back to Bob (refer to S112 and S118 in FIG. 21). Bob, after transferring the incoming messages INVITE F7~INVITE F10 and when receiving the receipt responses 200 OK F7-2 through 200 OK F10-2 thereto, determines the communication terminal that should be made to do the substitute response from among Tom, Jerry, Bill and Carol serving as the sources of the receipt responses (refer to S72 in FIG. 19). When determining, for example, Carol as the communication terminal that should be made to do the substitute response, Bob transmits the acknowledgment notifying messages ACK F7-3 through ACK F9-3 to the other communication terminals Tom, Jerry and Bill, and simultaneously sends disconnection messages BYE F11 through BYE F13 (refer to S65 in FIG. 18, and see FIG. 19). The incoming messages INVITE F7 through INVITE F9 transferred to Tom, Jerry and Bill are thereby invalidated.

Further, Bob sends a receipt response 200 OK F10-2' containing the contact information for specifying Carol serving as the communication terminal that should be made to do the substitute response to the source communication terminal Alice of the incoming message INVITE F1 (refer to S72 in FIG. 19). Carol, after sending to Bob the receipt response 200 OK F10-2 to the incoming message INVITE F10 and when receiving an acknowledgment notifying message ACK F10-3 from the source communication terminal Alice of the incoming message INVITE thereof (S115 in FIG. 21), becomes communicable in voice with Alice.

By the procedures described above, when the plurality of communication terminals (Tom, Jerry, Bill and Carol) give the substitute response requests (PICKUP F3 through PICKUP F6) to the communication terminal (Bob) receiving the incoming message INVITE, one substitute response request is selected, and the voice communications become possible between the communication terminal (Carol) as the requester of the selected substitute response request and the communication terminal (Alice) as the source of the incoming message INVITE.

Figure 23:
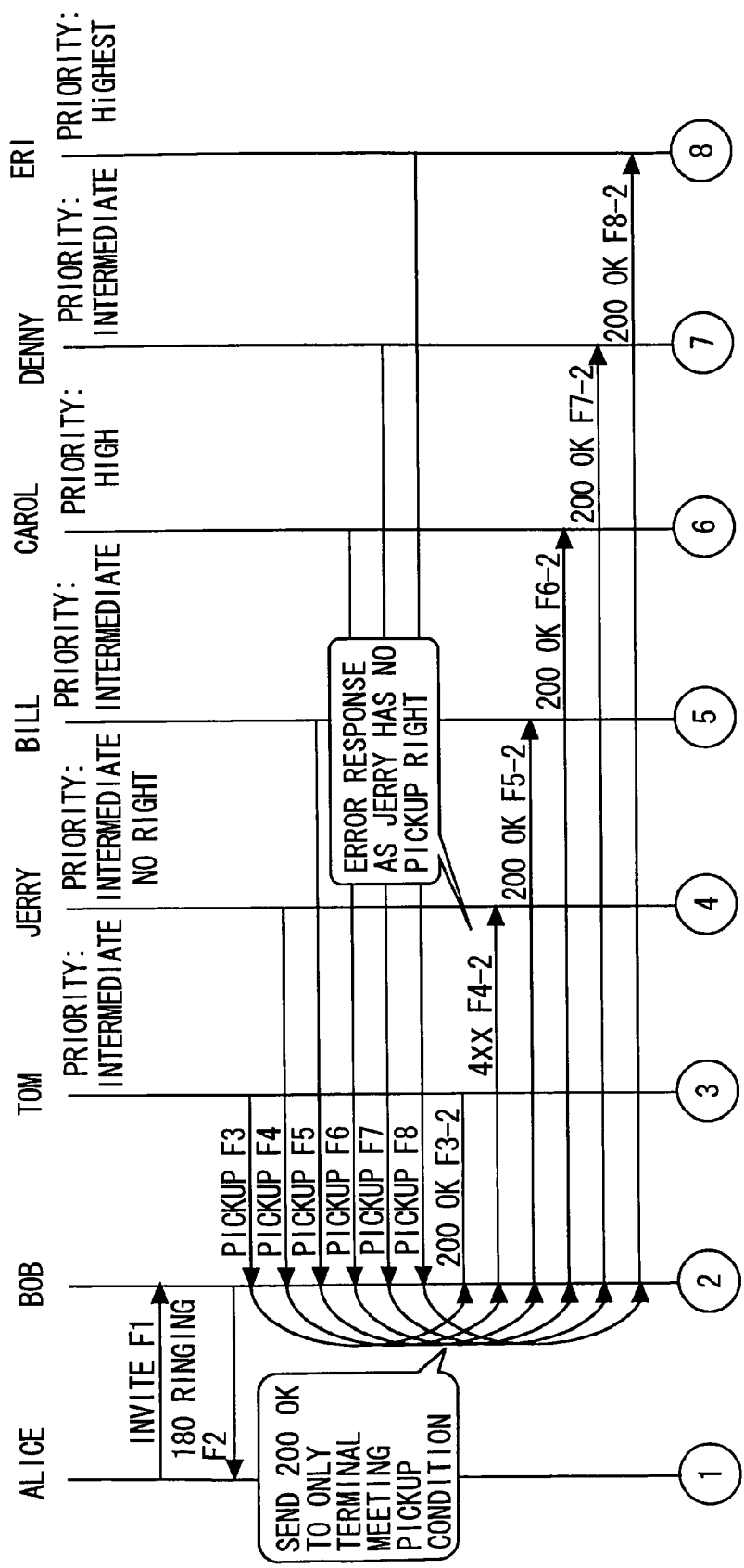
FIG. 23 is A sequence diagram showing an eighth example (part 1) of the processing procedure in the communication system according to the embodiment of the invention.
Figure 24:
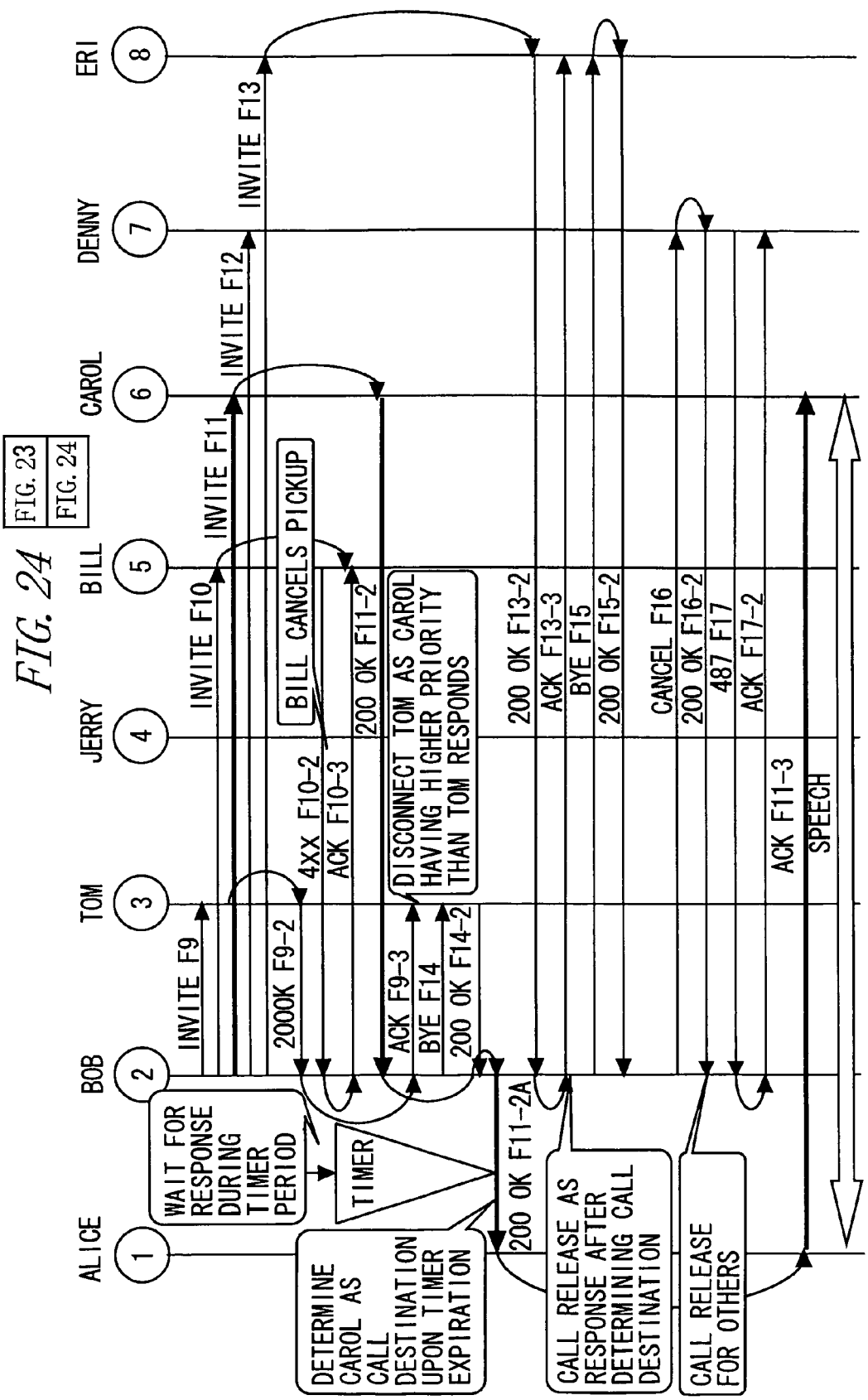
FIG. 24 is A sequence diagram showing the eighth example (part 2) of the processing procedure in the communication system according to the embodiment of the invention.

An example shown in FIGS. 23 and 24 represents a case in which seven pieces of communication terminals (Bob, Tom, Jerry, Bill, Carol, Denny and Eri) are included in the same segment (corresponding to the LAN 15 illustrated in FIG. 1), and Bob receives the incoming message INVITE from the communication terminal Alice. Priority levels (User-Priority) of Tom, Jerry, Bill and Denny are set to [intermediate], a priority level of Carol is set to [high], and a priority level of Eri is set to [highest]. Moreover, Jerry has no right of making the substitute response (PICKUP) to the call arrived at Bob.

In FIG. 23, when Bob receives a call originating from Alice (INVITE F1, 180 ringing F2), Tom, Jerry, Bill, Carol, Denny and Eri send PICKUP F3 through PICKUP F8 to Bob in order to make the substitute response requests. Jerry has no right of making the substitute response (PICKUP), and hence Bob sends an error message 4xx F4-2 to Jerry and transmits receipt responses 200 OK F3-2 and 200 OK F5-2 through 200 OK F8-2 to the other communication terminals Tom, Bill, Carol, Denny and Eri that meet the pickup condition (refer to S56 through S62 in FIG. 18).

Subsequently, in FIG. 24, Bob sends incoming messages INVITE F9 through INVITE F13 to the communication terminals Tom, Bill, Carol, Denny and Eri other than Jerry to which the error message 4xx F4-2 has been sent (refer to S61 in FIG. 18). With respect to the incoming message INVITE, Tom sends the first receipt response 200 OK F9-2 back to Bob, and Bill sends the error message 4xx F10-2 back to Bob to cancel the substitute response (PICKUP) (refer to S108 in FIG. 21), and Carol sends the receipt response 200 OK F11-2 back to Bob (refer to S112 in FIG. 21). Bob transmits an acknowledgment notifying message ACK F10-3 to the error message 4xx F10-2 given from Bill (refer to S65 in FIG. 18).

At this point of time, the response terminals to the incoming message INVITE given from Bob are Tom and Carol. The priority level of Tom is lower than the priority level of Carol, and hence Bob transmits to Tom an acknowledgment notifying message ACK F9-3 to the receipt response 200 OK F9-2, and further sends a call release message BYE F14. Tom sends to Bob a receipt response 200 OK F14-2 to this message BYE F14. Bob, when reaching a trigger for determining the communication terminal that is made to do the substitute response (timeout), determines Carol having the highest priority level as the communication terminal that is made to do the substitute response, and transmits a receipt response 200 OK F11-2A containing the contact information for specifying Carol to Alice serving as the source communication terminal of the incoming message INVITE (S72 and S74 in FIG. 19).

Thereafter, even when Eri having the highest priority level transmits to Bob the receipt response 200 OK F13-2 to the incoming message INVITE f13, as there has already passed the trigger for determining the communication terminal that is should be made to do the substitute response at this point of time, i.e., as Carol has been determined to be the communication terminal that is should be made to do the substitute response, Bob executes a call release procedure with Eri (BYE F15, 200 OK F15-2) after transmitting to Eri an acknowledgment notifying message ACK F13-3 to the receipt response 200 OK F13-2. Further, Bob executes a cancel procedure (CANCEL F16, 200 OK F16-2, 487 F17 and ACK F17-2) with Denny that does not make any response to the incoming message INVITE F12.

Alice receiving from Bob the receipt response 200 OK F11-2A containing the contact information for specifying Carol sends an acknowledgment notifying message ACK F11-3 to Carol, and Carol receives this acknowledgment notifying message ACK F11-3, thereby establishing the call between Alice and Carol. With this call established, the voice communications between Alice and Carol can be performed.

Figure 25:
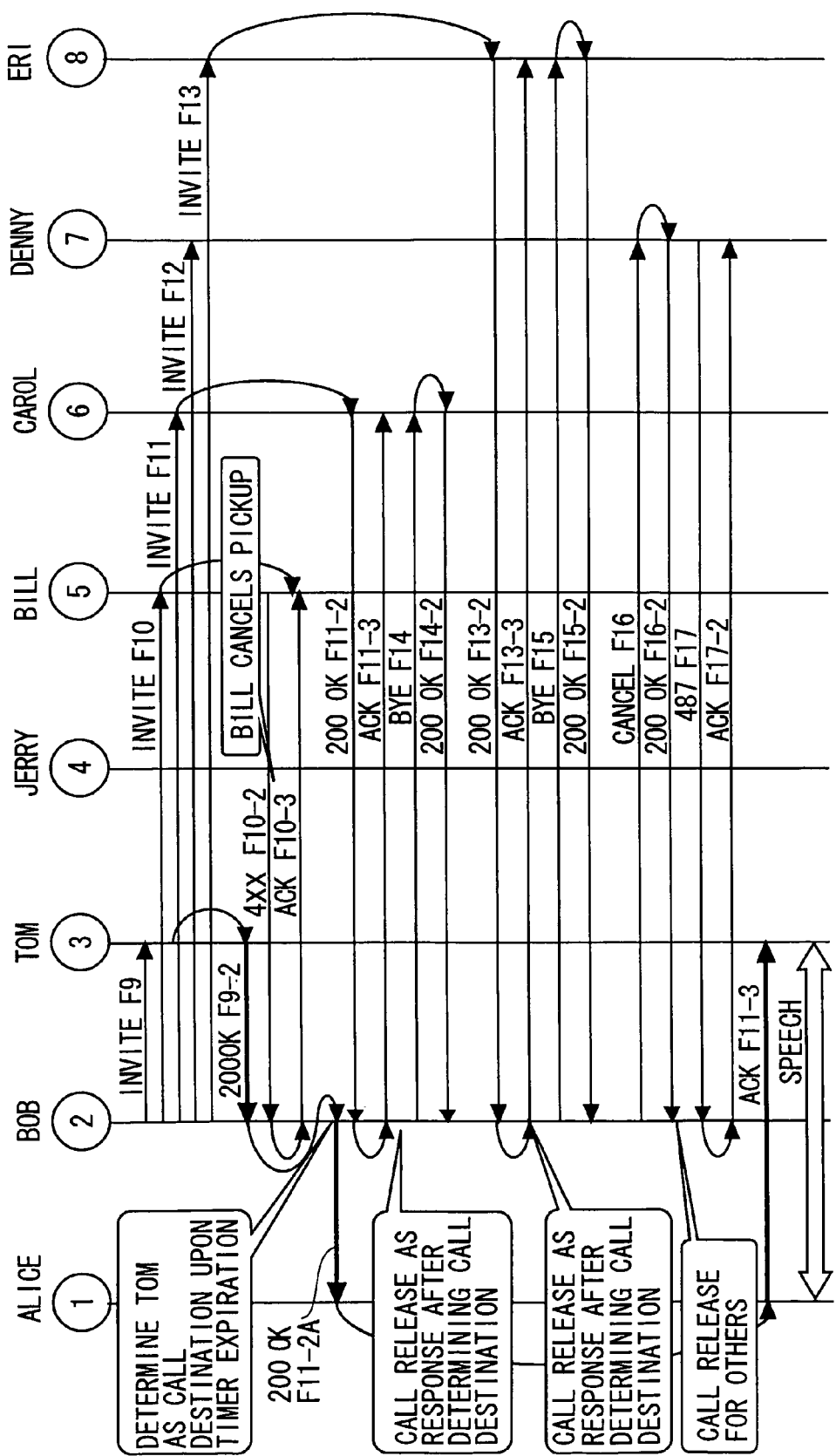
FIG. 25 is A sequence diagram showing a ninth example of the processing procedure in the communication system according to the embodiment of the invention.

After the communications based on the procedure shown in FIG. 23, the communications according to a procedure shown in FIG. 25 may be carried out. FIG. 25 shows a modified embodiment of that shown by FIG. 24. In this example, the communication terminal exhibiting the fastest response to the incoming message INVITE is determined as the communication terminal that should be made to do the substitute response.

In FIG. 25, Bob sends the incoming messages INVITE F5 through INVITE F13 to the communication terminals Tom, Bill, Carol, Denny and Eri other than Jerry having no right of pickup, Tom sends a receipt response 200 OK F9-2 back to Bob in response to the incoming message INVITE, and Bill transmits an error message 4xx F10-2 back to Bob in order to cancel the execution of the substitute response (PICKUP), wherein this procedure done so far is the same as the procedure shown in FIG. 24.

Bob, after receiving the receipt response 200 OK F9-2 from Tom, there being no response from other communication terminals till the trigger for determining the communication terminal that should make the substitute response has passed (till the timeout), determines Tom as the communication terminal that should be made to do the substitute response. Then, Bob sends a receipt response 200 OK F11-2A containing the contact information for specifying Tom to Alice as the source terminal of the incoming message INVITE.

Thereafter, even when Carol and Eri transmit to Bob the receipt responses 200 OK F11-2 and 200 OK F13-2 to the incoming messages INVITE F11 and INVITE F13, Tom has already been determined as the communication terminal that should be made to do the substitute response at this point of time, and therefore Bob executes in the same way as described above the call release procedure with Carol and Eri. Further, Bob executes the cancel procedure with Denny that does not make any response to the incoming message INVITE F12.

Through the communications based on the procedure explained above, the voice communications become possible between Tom that has sent fastest the receipt response 200 OK in response to the transfer of the incoming message INVITE and Alice as the source communication terminal of the incoming message INVITE.

As discussed above, the communication system in the embodiment, when the message reaches the terminating (destination) terminal from the source terminal, can simply actualize the substitute response by:

(1) transmitting by multicasting the message of the substitute response to the plurality of communication terminals including the terminating terminal from the communication terminal (the substitute response request terminal) making the request for doing the substitute response;

(2) transferring the incoming message to the substitute response request terminal from the terminating terminal receiving the substitute response request; and (3) transmitting the contact information indicating the substitute response request terminal to the source terminal from the terminating terminal. Further, a substitute response group can be organized from multicast destination groups by utilizing the multicasting. Note that broadcasting, which replaces the multicasting, may be utilized within the network segment.

According to the communication system, when viewed from the source terminal, the substitute response can be received in the same procedure as the message is normally transmitted to the destination. Moreover, the source terminal can recognize that the substitute response request has been received by comparing the self-possessed information for specifying the destination with the information for specifying the substitute response request terminal that is contained in the contact information sent back.

Moreover, according to the communication system, in the case wherein the plurality of communication terminals send the substitute response requests, the terminating terminal accepts the substitute response requests in a first-come first-served order and gets substitute response performed. Further, in the communication system, the priority levels can be assigned to the substitute response request messages transmitted from substitute response request terminals. The terminating terminal can also determine the communication terminal making the substitute response according to the priority levels.

Still further, according to the communication system, the authentication password can be assigned to the substitute response request message. Accordingly, the terminating terminal can also select the communication terminal making the substitute response in accordance with the authentication password.

Yet further, according to the communication system, the information for specifying the source terminal serving as the substitute response target terminal can be added to the substitute response request message. Hence, the communication terminal making the substitute response request can make substitute response request by designating the substitute response target source terminal.

Additionally, according to the communication system, the information for specifying the source terminal excluded from the substitute response target terminals can be added to the substitute response request message. Therefore, the communication terminal making substitute response request can also designate the source terminal undesirable for becoming the substitute response target terminal.

Still additionally, according to the communication system, the incoming message reaching the terminating terminal is transmitted to the substitute response request terminal. Therefore, the substitute response request terminal can present the source information to the user in a way that specifies the source terminal contained in the incoming message. The user is able to make the substitute response after recognizing the source terminal that becomes the substitute response target terminal.

Yet additionally, according to the communication system, when the substitute response requests are made by the plurality of communication terminals, the incoming message is copied and thus sent to the plurality of communication terminals, and the communication terminal making the substitute response can be determined from within the communication terminals that have sent the responses to the incoming message back thereto.

Storage Medium Readable by Computer

A program, etc. for making a computer, other device, machine, etc. actualize any one of the functions can be stored on a storage medium readable by the computer, etc. Then, the computer, etc. is made to read and execute the program on this storage medium, whereby the function can be provided.

Herein, the storage medium readable by the computer, etc. connotes a storage medium capable of storing information such as data, programs, etc. electrically, magnetically, optically, mechanically or by chemical action, which can be read from the computer and so on. Among these storage mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc. are given as the storage mediums fixed within the computer.

INDUSTRIAL APPLICABILITY

As discussed above, the communication system according to the invention has an effect of enabling other communication terminal (the second communication terminal) to make the response in a much simpler procedure to the ringing from the source communication terminal to a certain communication terminal (the first communication terminal), and is useful as the communication system enabling the response to the incoming call to be made by the other communication terminal as the substitute for the communication terminal receiving the call on the basis of SIP.

What is claimed is:

1. A communication system wherein a source communication terminal and a plurality of communication terminals, being connected to an IP (Internet Protocol) network, perform communications based on SIP (Session Initiation Protocol), the plurality of communication terminals including a first communication terminal and a second communication terminal, the second communication terminal comprising a unit to transmit a substitute response control message to the first communication terminal on the basis of a predetermined trigger when the first communication terminal receives an incoming message from the source communication terminal, the first communication terminal comprising an incoming message transfer unit to transfer to the second communication terminal the incoming message given from the source communication terminal when receiving the substitute response control message from the second communication terminal, and a response message transmitting unit to transmit to the source communication terminal a response message containing contact information for specifying the second communication terminal, wherein a call is established between the source communication terminal receiving the response message containing the contact information and the second communication terminal to which the incoming message has been transferred, the second communication terminal further comprising a unit to transmit a message for canceling the substitute response control message to the first communication terminal when receiving a transfer of another incoming message from another communication terminal than the first communication terminal, wherein the response message from the first communication terminal to the source communication terminal is not transmitted and the call between the source communication terminal and the second communication terminal is not established when receiving the transfer of the another incoming message from the another communication terminal to the second communication terminal.

2. A communication system in which a source communication terminal and a plurality of communication terminals, which are connected to an IP network, perform communications based on SIP, the plurality of communication terminals each comprising a unit to transmit a substitute response control message to a first communication terminal included in the plurality of communication terminals on the basis of a predetermined trigger when the first communication terminal receives an incoming message from the source communication terminal, the first communication terminal comprising: a terminal selection unit to select, when receiving the substitute response control message from each of the plurality of communication terminals as candidate communication terminals other than the first communication terminal, a second communication terminal to make a substitute response, from within the plurality of candidate communication terminals on the basis of the received substitute response control messages;

an incoming message control unit to make the selected second communication terminal obtain the incoming message given from the source communication terminal; and a unit to transmit to the source communication terminal a response message containing contact information for specifying the selected second communication terminal;

wherein a call is established between the source communication terminal receiving the response message containing the contact information and the second communication terminal that has obtained the incoming message, wherein the incoming message control unit further includes:

a unit to transfer the incoming message given from the source communication terminal to each of the plurality of candidate communication terminals each serving as a source of the substitute response control message; and a unit to transmit a response release message to the candidate terminals excluding the selected second communication terminal, and wherein the incoming message to the candidate communication terminals excluding the second communication terminal, is invalidated.

3. A communication system in which a source communication terminal and a plurality of communication terminals, which are connected to an IP network, perform communications based on SIP, the plurality of communication terminals each comprising a unit to transmit a substitute response control message to a first communication terminal included in the plurality of communication terminals on the basis of a predetermined trigger when the first communication terminal receives an incoming message from the source communication terminal, the first communication terminal comprising: a terminal selection unit to select, when receiving the substitute response control message from each of the plurality of communication terminals as candidate communication terminals other than the first communication terminal, a second communication terminal to make a substitute response, from within the plurality of candidate communication terminals on the basis of the received substitute response control messages;

an incoming message control unit to make the selected second communication terminal obtain the incoming message given from the source communication terminal; and a unit to transmit to the source communication terminal a response message containing contact information for specifying the selected second communication terminal;

wherein a call is established between the source communication terminal receiving the response message containing the contact information and the second communication terminal that has obtained the incoming message, wherein the substitute response control message contains priority level information representing a priority level, and the terminal selection unit selects the second communication terminal from within the plurality of candidate communication terminals on the basis of the priority level information.

4. A communication system in which a source communication terminal and a plurality of communication terminals, which are connected to an IP network, perform communications based on SIP, the plurality of communication terminals each comprising a unit to transmit a substitute response control message to a first communication terminal included in the plurality of communication terminals on the basis of a predetermined trigger when the first communication terminal receives an incoming message from the source communication terminal, the first communication terminal comprising: a terminal selection unit to select, when receiving the substitute response control message from each of the plurality of communication terminals as candidate communication terminals other than the first communication terminal, a second communication terminal to make a substitute response, from within the plurality of candidate communication terminals on the basis of the received substitute response control messages;

an incoming message control unit to make the selected second communication terminal obtain the incoming message given from the source communication terminal; and a unit to transmit to the source communication terminal a response message containing contact information for specifying the selected second communication terminal;

wherein a call is established between the source communication terminal receiving the response message containing the contact information and the second communication terminal that has obtained the incoming message, wherein each of the plurality candidate communication terminals comprises a unit to transmit a message for canceling the substitute response control messages to the first communication terminal after obtaining the incoming message, and the terminal selection unit excludes the candidate communication terminal serving as a source of the canceling message from the candidate terminals each selectable as the second communication terminal when the first communication terminal receives the message for canceling the substitute response control messages.

5. A communication terminal used in a communication system in which a source communication terminal and a plurality of communication terminals, which are connected to an IP network, perform communications based on SIP, comprising:

a unit to transmit a substitute response control message to a first communication terminal receiving an incoming message on the basis of a predetermined trigger when receiving the incoming message from the source communication terminal;

an incoming message obtaining unit to obtain the incoming message from the first communication terminal receiving the incoming message after transmitting the substitute response control message;

a call connection control unit to establish a call with the source communication terminal on the basis of the incoming message after obtaining the incoming message; and a unit to transmit a message for canceling the substitute response control messages to the first communication terminal when receiving a transfer of another incoming message from another communication terminal than the first communication terminal, wherein the call with the source communication terminal is not established when receiving the transfer of the another incoming message from the another communication terminal.

6. A communication terminal used in a communication system in which a source communication terminal and a plurality of communication terminals, which are connected to an IP network, perform communications based on SIP, comprising:

a terminal selection unit selecting, a substitute response communication terminal to make a substitute response, from within the plurality of communication terminals as candidate communication terminals on the basis of received substitute response control messages from the plurality of candidate communication terminals included in the plurality of communication terminals after receiving an incoming message from the source communication terminal;

an incoming message control unit to make the selected substitute response communication terminal obtain the incoming message given from the source communication terminal; and a unit to transmit to the source communication terminal a response message containing contact information for specifying the selected substitute response communication terminal, wherein the incoming message control unit includes:

a unit to transfer the incoming message given from the source communication terminal to the selected substitute response communication terminal of the plurality of candidate communication terminals each serving as a source of the substitute response control message; and a unit to transmit a response release message to the candidate communication terminals excluding the selected substitute response communication terminal, and wherein the incoming message to the candidate communication terminals excluding the substitute response communication terminal, is invalidated.

7. A communication terminal used in a communication system in which a source communication terminal and a plurality of communication terminals, which are connected to an IP network, perform communications based on SIP, comprising:

a terminal selection unit selecting, a substitute response communication terminal to make a substitute response, from within the plurality of communication terminals as candidate communication terminals on the basis of received substitute response control messages from the plurality of candidate communication terminals included in the plurality of communication terminals after receiving an incoming message from the source communication terminal;

an incoming message control unit to make the selected substitute response communication terminal obtain the incoming message given from the source communication terminal; and a unit to transmit to the source communication terminal a response message containing contact information for specifying the selected substitute response communication terminal, wherein each substitute response control message contains priority level information representing a priority level, and the terminal selection unit selects the substitute response communication terminal from within the plurality of candidate communication terminals on the basis of the priority level information.

8. A communication terminal used in a communication system in which a source communication terminal and a plurality of communication terminals, which are connected to an IP network, perform communications based on SIP, comprising:
a terminal selection unit selecting, a substitute response communication terminal to make a substitute response, from within the plurality of communication terminals as candidate communication terminals on the basis of received substitute response control messages from the plurality of candidate communication terminals included in the plurality of communication terminals after receiving an incoming message from the source communication terminal;
an incoming message control unit to make the selected substitute response communication terminal obtain the incoming message given from the source communication terminal; and
a unit to transmit to the source communication terminal a response message containing contact information for specifying the selected substitute response communication terminal,
wherein the selection unit, when receiving a message for canceling the substitute response control message, excludes the candidate communication terminal serving as a source of the canceling message from the candidate terminals each selectable as the substitute response communication terminal.

9. An executable-by-computer program executed on a communication terminal used in a communication system in which a source communication terminal and a plurality of communication terminals, which are connected to an IP network, perform communications based on SIP, comprising:
transmitting a substitute response control message to a first communication terminal receiving an incoming message on the basis of a predetermined trigger when any one communication terminal included in the plurality of communication terminals receives the incoming message from the source communication terminal;
obtaining the incoming message from the first communication terminal receiving the incoming message after transmitting the substitute response control message;
establishing a call with the source communication terminal on the basis of the incoming message after obtaining the incoming message; and
transmitting a message for canceling the substitute response control message to the first communication terminal when receiving a transfer of another incoming message from another communication terminal than the first communication terminal,
wherein the call with the source communication terminal is not established when receiving the transfer of the another incoming message from the another communication terminal.

10. A storage medium readable by a computer recording an executable-by-computer program executed on a communication terminal used in a communication system in which a source communication terminal and a plurality of communication terminals, which are connected to an IP network, perform communications based on SIP, the program comprising:
transmitting a substitute response control message to a first communication terminal receiving an incoming message on the basis of a predetermined trigger when any one communication terminal included in the plurality of communication terminals receives the incoming message from the source communication terminal;
obtaining the incoming message from the first communication terminal receiving the incoming message after transmitting the substitute response control message;
establishing a call with the source communication terminal on the basis of the incoming message after obtaining the incoming message; and
transmitting a message for canceling the substitute response control message to the first communication terminal when receiving a transfer of another incoming message from another communication terminal than the first communication terminal,
wherein the call with the source communication terminal is not established when receiving the transfer of the another incoming message from the another communication terminal.

* * * * *